United States Patent
Takeda et al.

(10) Patent No.: US 12,177,799 B2
(45) Date of Patent: Dec. 24, 2024

(54) TERMINAL

(71) Applicant: NTT DOCOMO, INC., Tokyo (JP)

(72) Inventors: Daiki Takeda, Tokyo (JP); Hiroki Harada, Tokyo (JP); Takuma Takada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 331 days.

(21) Appl. No.: 17/765,231

(22) PCT Filed: Oct. 3, 2019

(86) PCT No.: PCT/JP2019/039213
§ 371 (c)(1),
(2) Date: Mar. 30, 2022

(87) PCT Pub. No.: WO2021/064969
PCT Pub. Date: Apr. 8, 2021

(65) Prior Publication Data
US 2022/0346043 A1     Oct. 27, 2022

(51) Int. Cl.
*H04W 56/00* (2009.01)
*H04W 24/10* (2009.01)

(52) U.S. Cl.
CPC ......... *H04W 56/001* (2013.01); *H04W 24/10* (2013.01)

(58) Field of Classification Search
None
See application file for complete search history.

(56) References Cited

U.S. PATENT DOCUMENTS

| | | | |
|---|---|---|---|
| 2013/0142125 A1 | 6/2013 | Shimezawa et al. | |
| 2016/0360462 A1* | 12/2016 | Chockalingam | H04W 36/30 |
| 2019/0229973 A1 | 7/2019 | Sengupta et al. | |
| 2020/0128481 A1* | 4/2020 | Kim | H04W 48/14 |
| 2021/0076339 A1* | 3/2021 | Kalhan | H04B 17/318 |
| 2021/0144043 A1* | 5/2021 | Sengupta | H04J 11/0076 |
| 2021/0306888 A1* | 9/2021 | Kim | H04W 24/08 |
| 2022/0132446 A1* | 4/2022 | Astrom | H04L 5/0094 |

FOREIGN PATENT DOCUMENTS

WO     2012/029845 A1     3/2012

OTHER PUBLICATIONS

Office Action issued in counterpart Chinese Patent Application No. 201980100963.X mailed on Sep. 7, 2023 (14 pages).
3GPP TSG RAN WG1 #97; R1-1907071 "Summary of the use of RSS for measurement improvements" Sony; Reno, USA; May 13-17, 2019 (5 pages).
Office Action issued in Japanese Application No. 2021-550908; Dated Nov. 28, 2023 (5 pages).
International Search Report issued in PCT/JP2019/039213 on Apr. 14, 2020 (5 pages).

(Continued)

*Primary Examiner* — Phirin Sam
(74) *Attorney, Agent, or Firm* — Osha Bergman Watanabe & Burton LLP

(57) ABSTRACT

A terminal includes a controller configured to determine a candidate resource location where a resynchronization signal of a neighbor cell is possibly transmitted based on information on the neighbor cell; and a receiver configured to receive the resynchronization signal of the neighbor cell based on the candidate resource location.

4 Claims, 17 Drawing Sheets

(56) References Cited

OTHER PUBLICATIONS

Written Opinion of the International Searching Authority issued in PCT/JP2019/039213 on Apr. 14, 2020 (3 pages).
3GPP TS 36.213 V15.6.0; "3rd Generation Partnership Project; Technical Specification Group Radio Access Network; Evolved Universal Terrestrial Radio Access (E-UTRA); Physical layer procedures (Release 15)"; Jun. 2019 (551 pages).
3GPP TS 36.331 V15.6.0; "3rd Generation Partnership Project; Technical Specification Group Radio Access Network; Evolved Universal Terrestrial Radio Access (E-UTRA); Radio Resource Control (RRC); Protocol specification (Release 15)"; Jun. 2019 (960 pages).
Huawei, HiSilicon; "Considerations on RSS for measurement improvements"; 3GPP TSG RAN WG1 Meeting #98, R1-1908711; Prague, Czech Republic; Aug. 26-30, 2019 (3 pages).
Office Action issued in Chinese Application No. 201980100963.X, dated Feb. 28, 2024 (14 pages).
Nokia et al.; "Use of RSS for measurement improvements"; 3GPP TSG-RAN WG1 Meeting #98, R1-1908299; Prague, Czechia; Aug. 26-30, 2019 (3 pages).
Office Action issued in the counterpart Russian Patent Application No. 2022109912, mailed on Mar. 15, 2023 (12 bages).
Office Action issued in the counterpart Japanese Patent Application No. 2021-550908, mailed on Jul. 4, 2023 (6 bages).
ZTE; "Use of RSS for measurement improvement"; 3GPP TSG RAN WG1 Meeting #98, R1-1908263; Prague, CZ; Aug. 26-30, 2019 (5 pages).

\* cited by examiner

```
RSS-Config-r15 ::= SEQUENCE {
duration-r15 ENUMERATED {sf8, sf16, sf32, sf40},
freqLocation-r15 INTEGER (0..98),
periodicity-r15 ENUMERATED {ms160, ms320, ms640, ms1280},
powerBoost-r15 ENUMERATED {dB0, dB3, dB4dot8, dB6},
timeOffset-r15 INTEGER (0..31)
}
```

TERMINAL

TECHNICAL FIELD

The present invention relates to a measurement technique in a radio communication system.

BACKGROUND ART

For enhancements of eMTC in LTE Rel-15, reducing the system acquisition time was discussed. At this time, there was a concern that PSS/SSS redetection takes time when a user terminal resynchronizes time and frequency. Further, PSS/SSS enhancements and signals for resynchronization were discussed. As a result, a signal for resynchronization called a resynchronization signal (RSS) was supported in Rel-15.

In Rel-16, enhancements of eMTC have been further discussed, and as one of the enhancements, RSS-based measurements have been investigated.

RELATED-ART DOCUMENTS

Non-Patent Documents

[Non-Patent Document 1] 3GPP TS 36.213 V15.6.0 (2019-06)
[Non-Patent Document 2] 3GPP TS 36.331 V15.6.0 (2019-06)

SUMMARY OF THE INVENTION

Problem to be Solved by the Invention

Assuming that a user terminal measures the RSRP (received power) of an RSS transmitted from a neighbor cell, it is desirable for the user terminal to receive information on the time-frequency location of the RSS of the neighbor cell from a base station apparatus of a serving cell.

As described above, when the information on the time-frequency location of the RSS of the neighbor cell is received from the base station apparatus of the serving cell, there is a problem in that signaling overhead increases.

In view of the above, an object of the present invention is to provide a technique that reduces signaling overhead required when a user terminal performs measurement using a resynchronization signal of a neighbor cell.

Means to Solve the Problem

According to the disclosed technique, a terminal includes a controller configured to determine a candidate resource location where a resynchronization signal of a neighbor cell is possibly transmitted based on information on the neighbor cell; and a receiver configured to receive the resynchronization signal of the neighbor cell based on the candidate resource location.

Effects of the Invention

According to the disclosures, it is possible to provide a technique that reduces signaling overhead required when a user terminal performs measurement using a resynchronization signal of a neighbor cell.

MODE FOR CARRYING OUT THE INVENTION

Embodiments of the present invention will be described below with reference to the drawings. Note that the embodiments described below are merely examples, and embodiments to which the present invention is applied are not limited to the following embodiments.

An existing technology may be used as necessary when a radio communication system according to the embodiments of the present invention is operated. The existing technology may be LTE or NR; however, the existing technology is not limited to LTE or NR. The present invention may be applied to any radio communication system.

Further, in the embodiments, a duplex scheme may be a time division duplex (TDD) scheme, a frequency division duplex (FDD) scheme, or any other scheme (such as flexible duplex).

Further, a resynchronization signal (RSS) will be described in Examples 1 to 3; however, other signals can be applied to Examples 1 to 3. The resynchronization signal may be replaced with another signal (e.g., a synchronization signal).

(System Configuration)

Figure 1:
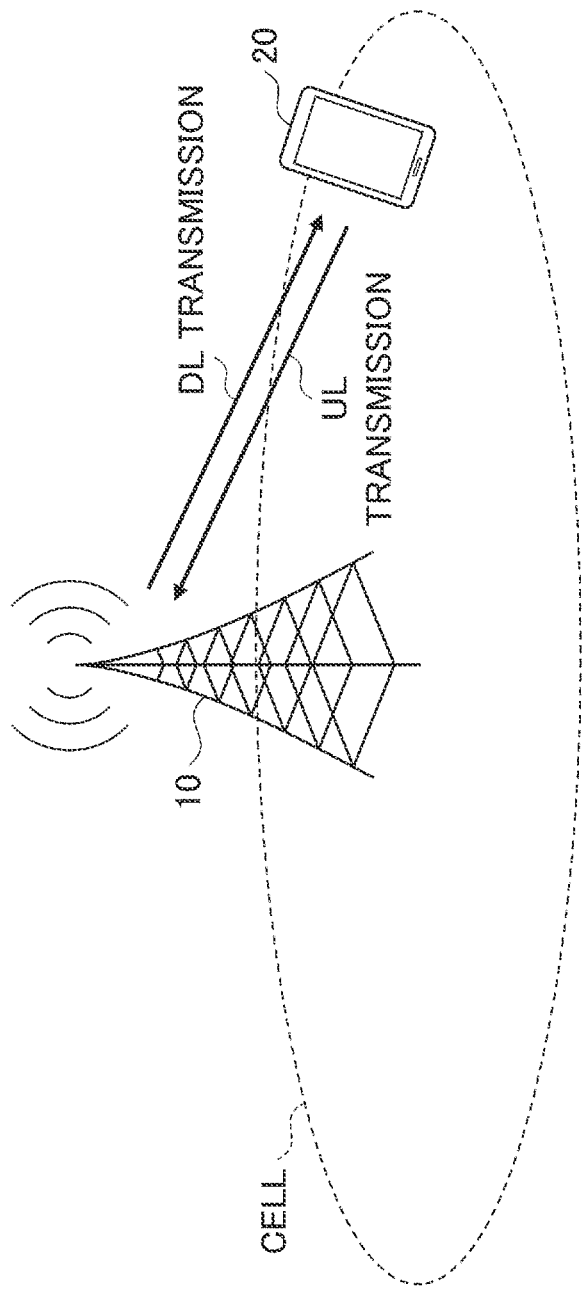
FIG. 1 is a diagram illustrating a radio communication system according to an embodiment of the present invention.

FIG. 1 is a diagram illustrating a radio communication system according to an embodiment of the present invention. As illustrated in FIG. 1, the radio communication system includes a base station apparatus 10 and a user terminal 20. The one base station apparatus 10 and the one user terminal 20 illustrated in FIG. 1 are merely examples, and a plurality of base station apparatuses 10 and a plurality of user terminals 20 may be provided.

For example, the base station apparatus 10 may provide a serving cell (which may also be referred to as an own cell) for the user terminal 20, and one or more neighbor cells located near the serving cell may be configured by one or more other base station apparatuses. The user terminal 20 may be referred to as a "terminal."

The base station apparatus 10 is a communication device that provides one or more cells and wirelessly communicates with the user terminal 20. Physical resources of a wireless signal are defined by the time domain and the frequency domain, the time domain may be defined by subframes or slots or OFDM symbols, and the frequency domain may be defined in sub-bands, subcarriers or resource blocks.

As illustrated in FIG. 1, the base station apparatus 10 transmits control information or data to the user terminal 20 in downlink (DL), and receives control information or data from the user terminal 20 in uplink (UL). Both the base station apparatus 10 and the user terminal 20 can transmit and receive signals by applying beamforming. In addition, both the base station apparatus 10 and the user terminal 20 can apply multiple-input multiple-output (MIMO) communication to DL or UL. The base station apparatus 10 and the user terminal 20 may both communicate via a secondary cell (SCell) and a primary cell (PCell) in carrier aggregation (CA).

The user terminal 20 is a communication apparatus equipped with a wireless communication function, such as a smartphone, a tablet, a wearable device, or a communication module for M2M (Machine-to-Machine). As illustrated in FIG. 1, the user terminal 20 utilizes various communication services provided by the radio communication system by receiving control information or data from the base station apparatus 10 in DL and transmitting control information or data to the base station apparatus 10 in UL. The user terminal 20 according to the present embodiment is assumed to be a terminal having a reduced usable bandwidth corresponding to NB-IoT or eMTC; however, the present invention is not limited thereto.

Figure 2:
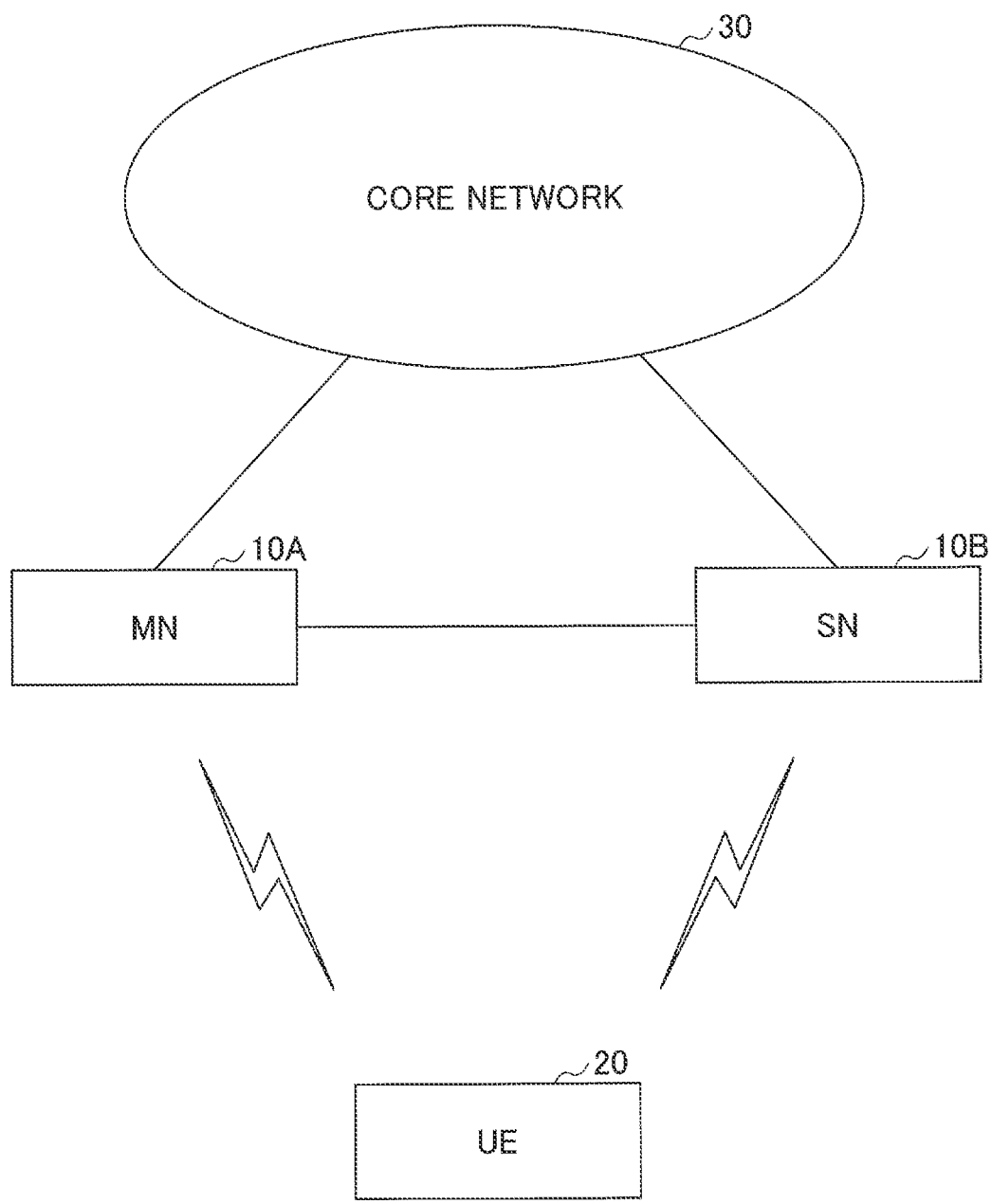
FIG. 2 is a diagram illustrating the radio communication system according to an embodiment of the present invention.

FIG. 2 illustrates an example of a configuration of the radio communication system in which NR-DC (NR-Dual connectivity) is performed. As illustrated in FIG. 2, a base station apparatus 10A serving as a master node (MN) and a base station apparatus 10B serving as a secondary Node (SN) are provided. The base station apparatus 10A and the base station apparatus 10B are each connected to a core network. The user terminal 20 communicates with both the base station apparatus 10A and the base station apparatus 10B.

A cell group provided by the base station apparatus 10A serving as the MN is referred to as a master cell group (MCG), and a cell group provided by the base station apparatus 10B serving as the SN is referred to as a secondary cell group (SCG). The operations described in Examples 1 to 3 below may be performed in any of the configurations of FIG. 1 and FIG. 2.

(RSS)

In the present embodiment, an RSS is transmitted from each of the base station apparatus 10 of the serving cell and base station apparatuses of one or more neighbor cells.

An RSS sequence is generated based on a Gold sequence. RSS is mapped to two physical resource blocks (2PRBs) by QPSK modulation.

The frequency location of an RSS is configurable, and is indicated from the base station apparatus 10 to the user terminal 20 by system information (SIB). Specifically, the RSS can be located in two successive PRBs in the LTE system band and the location of the lowermost PRB is indicated.

Figure 3:
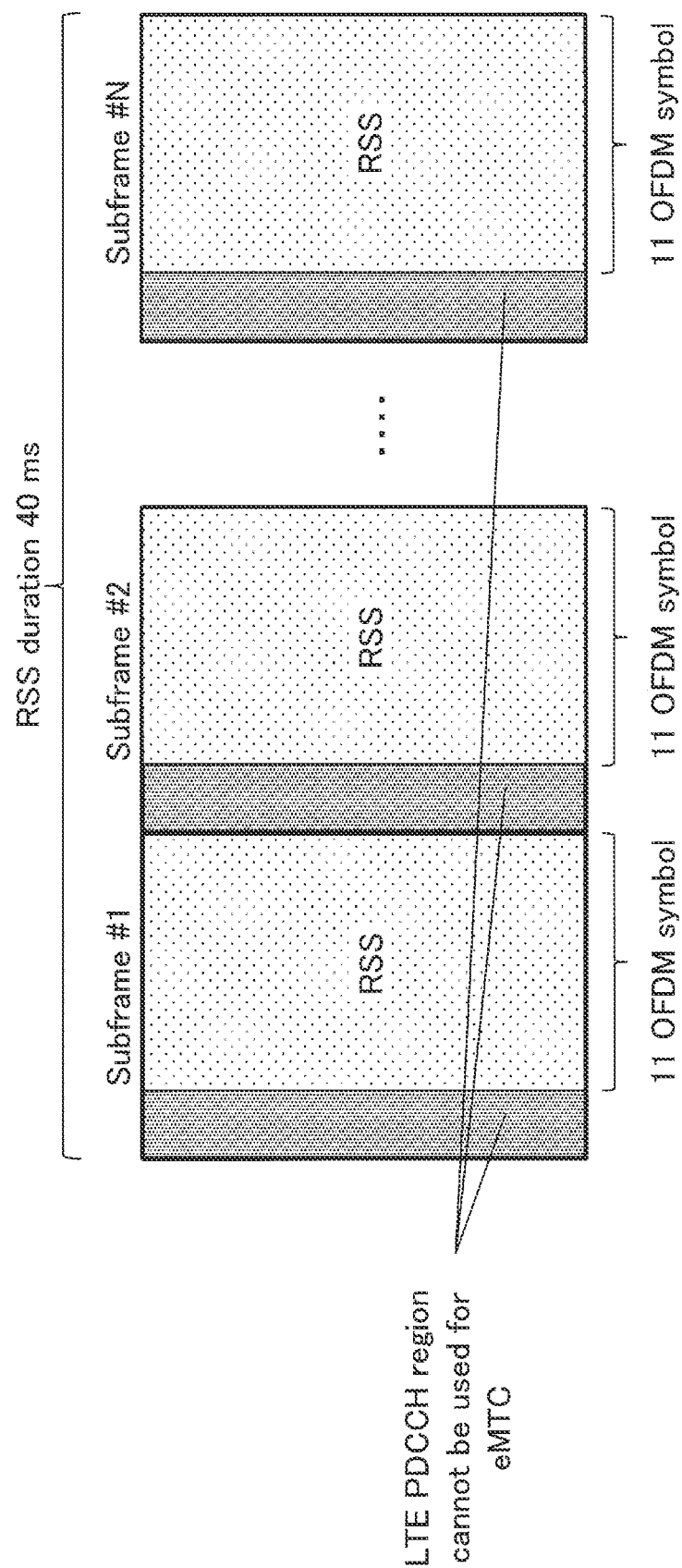
FIG. 3 is a diagram illustrating an RSS configuration.

The transmission periodicity, the time offset, and the transmission time length of the RSS are also configurable, and are indicated from the base station apparatus 10 to the user terminal 20 by system information (SIB). Specifically, the transmission periodicity is selected from 160, 320, 640, and 1280 ms, and the granularity of the time offset is determined by the periodicity (1 frame, 2 frames, or 4 frames). The transmission length is selected from 8, 16, 32, and 40 ms. FIG. 3 illustrates an example of an RSS configuration with a time length of 40 ms.

As can be seen from FIG. 3, for the RSS, the amount of time-frequency resources is large as compared to the PSS/SSS, and the user terminal 20 can acquire time-frequency synchronization with the base station apparatus 10 in a short period of time. As described in Non-Patent Document 1, 4.1 Cell search, "For a BL/CE UE, if the UE is configured with high layer parameter RSS-Config, the UE can use the resynchronization signal (as defined in [3]) to re-acquire time and frequency synchronization with the cell.", the user terminal 20 can uses the RSS for time and frequency resynchronization.

In the present embodiment, RSSs are used not only for time-frequency synchronization, but also for measurement. For example, the user terminal 20 receives an RSS and measures the RSRP (received power) or RSRQ (received quality).

For example, in the RRC-Idle state, the user terminal 20 determines cell reselection (cell transition) based on the received power measured using an RSS of the serving cell and the received power measured using an RSS of each of one or more neighbor cells.

For example, in the RRC-Connected state, the user terminal 20 indicates the received power measured using the RSS of the serving cell and the received power measured using the RSS of each of the one or more neighbor cells to the base station apparatus 10, and the base station apparatus 10 determines whether to cause the user terminal 20 to perform handover. For example, the measured amount of an RSS is hereinafter referred to as received power, but the measured amount of an RSS may be referred to as received quality.

In order for the user terminal 20 to measure the received power of an RSS transmitted from each of one or more neighbor cells, it is desirable for the user terminal 20 to know a time-frequency resource location (hereinafter referred to as a time-frequency location, for convenience of description) of the RSS transmitted from each of the one or more neighbor cells. In view of the above, in the present embodiment, the base station apparatus 10, which serves as the serving cell, may transmit parameters indicating a time-frequency location for each of the neighbor cells to the user terminal 20 by an RRC message (such as system information). Specifically, the following parameters may be transmitted, for example.

Ce-rss-periodicity-config: RSS periodicity {160, 320, 640, 1280}ms

Ce-rss-duration-config: RSS duration {8, 16, 32, 40} subframes

Ce-rss-freqPos-config: RSS frequency location (lowest physical resource block number)

Ce-rss-timeOffset-config: RSS time offset in number of radio frames

Ce-rss-powerBoost-config: RSS power offset relative to LTE CRS {0, 3, 4.8, 6} dB However, if detailed information indicating the time-frequency location for each of the neighbor cells is indicated from the base station apparatus 10 to the user terminal 20, the signaling amount would increase. Therefore, the number of RSS time-frequency locations may be restricted. For example, the "RSS time offset and RSS frequency location" may be determined as a function of the cell ID.

(Example of Basic Operation)

Figure 4:
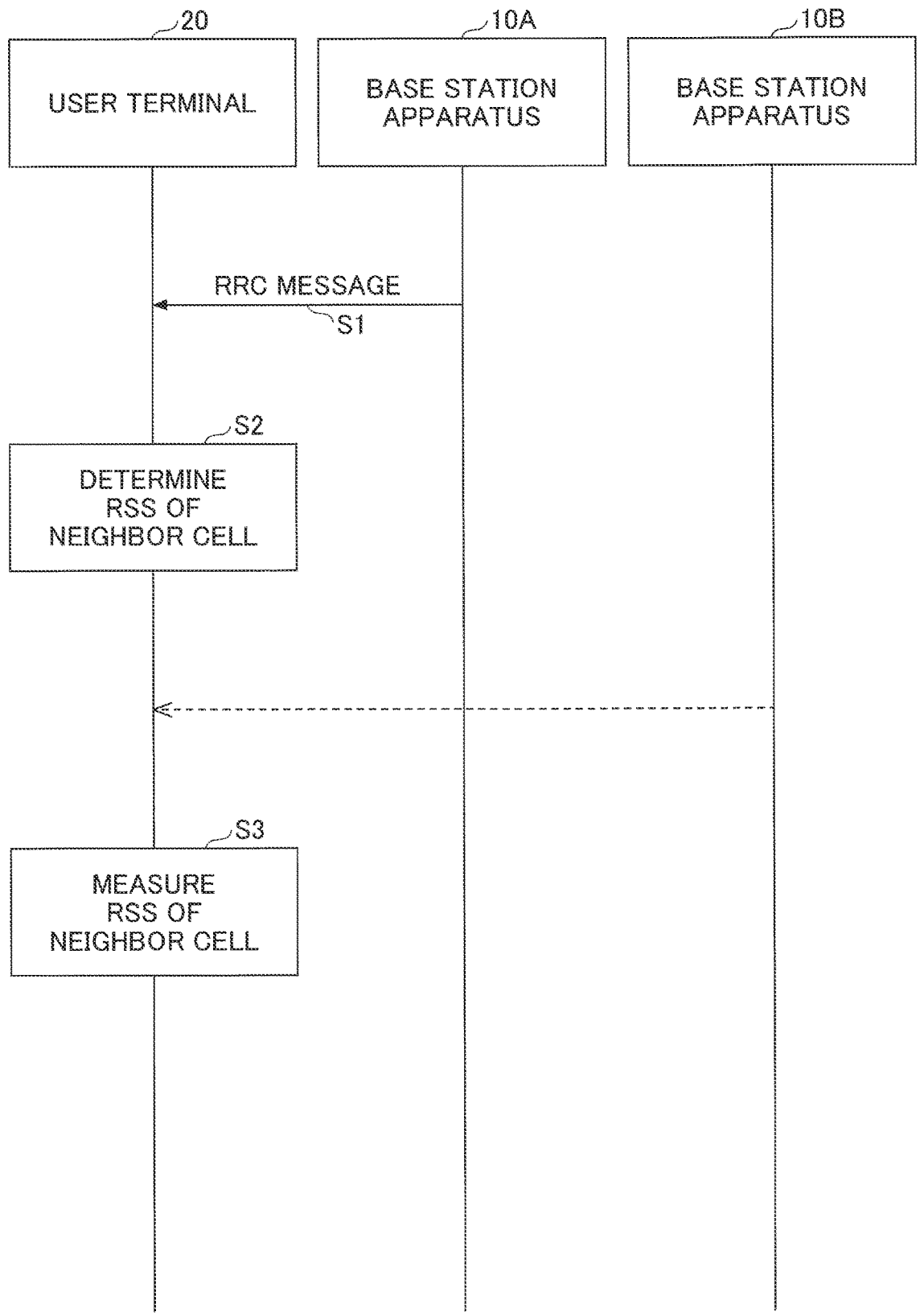
FIG. 4 is a diagram illustrating an example of a basic operation.

FIG. 4 is a diagram illustrating an example of a basic operation according to the present embodiment (including Examples 1 to 3). In FIG. 4, a base station apparatus 10A is a base station apparatus of a serving cell of a user terminal 20, and a base station apparatus 10B is a base station apparatus of a neighbor cell. While there may be a plurality of neighbor cells, FIG. 4 illustrates one base station apparatus of one neighbor cell for convenience of description.

In S1, the user terminal 20 receives an RRC message (such as system information) including configuration information of the time-frequency location of an RSS of the serving cell from the base station apparatus 10. As described in Examples 1 to 3 below, the RRC message may include information on the location of an RSS of the neighbor cell in the time domain or the frequency domain. Information on the location of the RSS of the neighbor cell in the time domain or the frequency domain may be transmitted via an RRC message that is different from an RRC message indicating configuration information of the time-frequency location of the RSS of the serving cell.

Figures 5, 6:
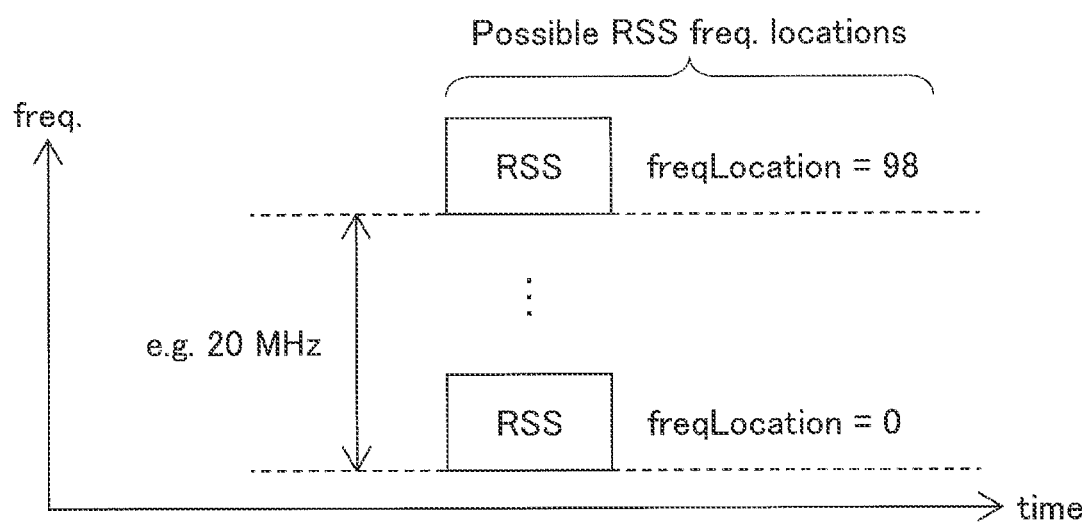
FIG. 5 is a diagram illustrating an example of setting information of an RSS.
FIG. 6 is a diagram illustrating examples of RSS locations in the frequency direction.

FIG. 5 illustrates an example of the configuration information of the time-frequency location of the RCC of the serving cell (extracted from Non-Patent Document 2). FIG. 6 illustrates possible RSS locations in the frequency domain when the system bandwidth is 20 MHz. FIG. 6 indicates that there are 99 possible RSS locations from 0 to 98.

In S2 of FIG. 4, the user terminal 20 determines the time and frequency location (or may determine the time and frequency range) of the RSS of the neighbor cell. In S3, the user terminal 20 receives the RSS of the neighbor cell and measures the power of the received RSS.

FIG. 4 is a diagram that focuses on RSS-based measurement for the neighbor cell. Thus, RSS-based measurement for the neighbor cell is illustrated. However, the user terminal 20 may perform RSS-based measurement for the neighbor cell in addition to RSS-based measurement for the serving cell.

In FIG. 4, the user terminal 20 may be in the RRC-Idle state or in the RRC-Connected state at the time of measurement for the neighbor cell.

In the following Examples 1 to 3, more detailed example operations will be described. Example 1, Example 2, and Example 3 may be implemented in any combination.

Example 1

As illustrated in FIG. 6, RSS frequency resource locations (frequency locations) can be configured as appropriate in the LTE system bandwidth and cell-specific configuration is possible.

However, when such RSS frequency locations are assumed, there may be a possibility that an RSS of a neighbor cell may fall outside a frequency range that can be monitored by the user terminal 20 when RSS-based measurement for the neighbor cell is assumed.

In such a case, the user terminal 20 would not be able to simultaneously monitor the RSS of the serving cell and the RSS of the neighbor cell, or RSSs of a plurality of neighbor cells. Therefore, there may be a possibility that the user terminal 20 may be forced to perform measurements over multiple RSS periodicities, thus increasing the measurement load.

Figure 7:
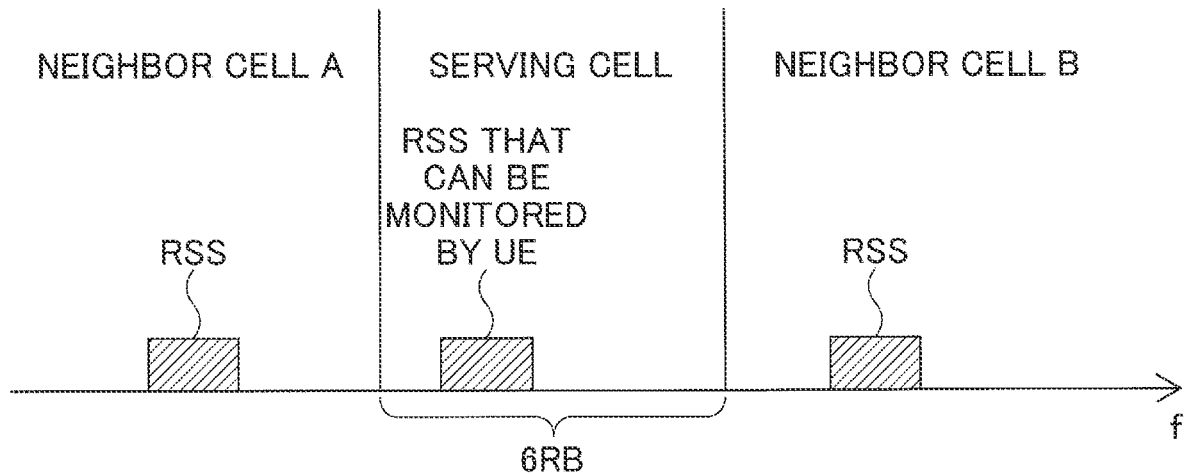
FIG. 7 is a diagram illustrating a problem according to Example 1.

FIG. 7 illustrates an example in which RSSs of neighbor cells fall outside a frequency range that can be monitored by the user terminal 20. In the example of FIG. 7, the user terminal 20 can monitor a 6 RB bandwidth. As illustrated in FIG. 7, both an RSS of a neighbor cell A and an RSS of a neighbor cell B are outside the frequency range that can be monitored by the user terminal 20. In this case, for example, the user terminal 20 may be unable to monitor the RSS of the neighbor cell A and the RSS of the neighbor cell B. Alternatively, the user terminal 20 may be required to move the frequency range (6RB) such that the RSS of the neighbor cell A and the RSS of the neighbor cell B can be monitored. Such an operation may increase the load.

Accordingly, in Example 1, the base station apparatus 20 explicitly or implicitly transmits, to the user terminal 20, information indicating whether the frequency location of the RSS of the neighbor cell is close to the frequency location (specified by RSS-config) of the RSS of the serving cell. Because the user terminal 20 can understand that the frequency location of the RSS of the neighbor cell is close to the frequency location of the RSS of the serving cell based on the information, the user terminal 20 can monitor the RSS of the neighbor cell with less load. In Example 1, from the viewpoint of the base station apparatus, it is assumed that RSSs of neighbor cells are located in a specific frequency range.

Specifically, Examples 1-1 to 1-3 are described. The following Examples 1-1 to 1-3 indicate only one neighbor cell, but the number of neighbor cells may be two or more.

Example 1-1

In Example 1-1, the base station apparatus 10 indicates, to the user terminal 20, information indicating whether the frequency location of the RSS of the neighbor cell is common to (the same as) the frequency location of the RSS of the serving cell, or information indicating whether the frequency location of the RSS of the neighbor cell and the frequency location of the RSS of the serving cell are within a specific frequency range.

The above-described information may be transmitted along with the configuration information of the RSS of the serving cell in S1 of FIG. 4, or may be transmitted at a different timing from S1 of FIG. 4. Further, the above-described information may be transmitted via any of an RRC message, MAC CE, and DCI. The above-described information may include identification information for identifying the neighbor cell (such as the cell ID of the neighbor cell). The identification information allows the user terminal 20 to understand from which neighbor cell the user terminal 20 receives the RSS. Note that the cell ID can be obtained from an RSS sequence.

Figure 8:
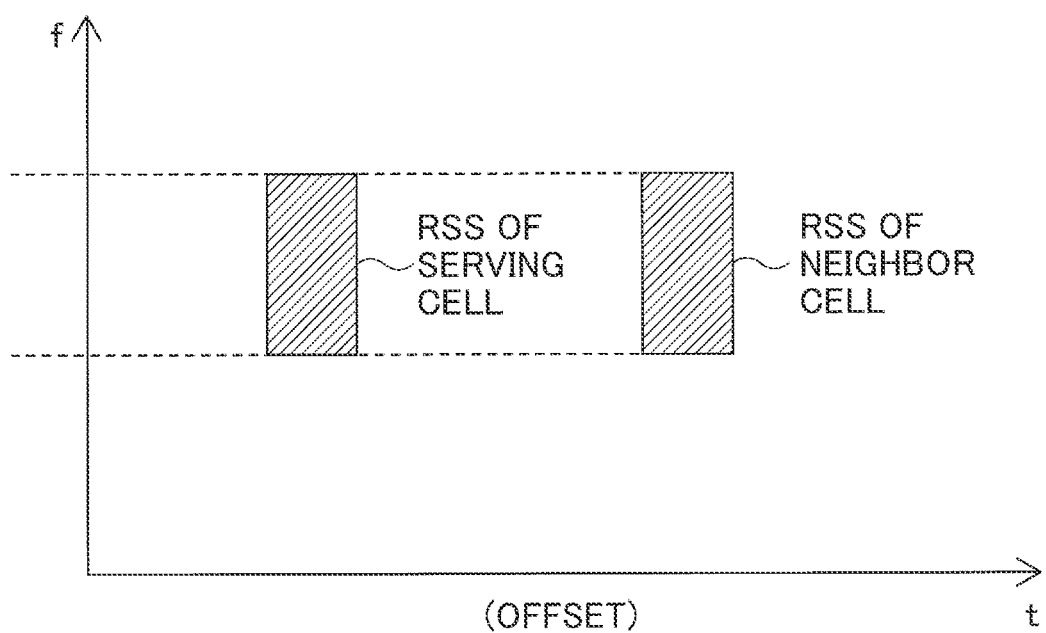
FIG. 8 is a diagram illustrating an example of RSS locations according to Example 1-1.

FIG. 8 illustrates an example of RSS time-frequency locations in a case where the base station apparatus 10 transmits, to the user terminal 20, information indicating that the frequency location of the RSS of the neighbor cell is common to (the same as) the frequency location of the RSS of the serving cell. The horizontal axis represents time, and specifically represents time offset. That is, the RSSs are transmitted periodically at the illustrated time locations.

The user terminal 20 knows the time-frequency location (that can be monitored by the user terminal 20) of the RSS of the serving cell by the RSS-Config. Therefore, the user terminal 20 can receive the RSS of the neighbor cell at the frequency location the same as that of the serving cell for measurement.

For example, the time location of the RSS of the neighbor cell is indicated from the base station apparatus 10 to the user terminal 20. The user terminal 20 may blindly detect the RSS of the neighbor cell, assuming that the time location of the RSS of the neighbor cell is close to or the same as the time location of the RSS of the serving cell.

Figure 9:
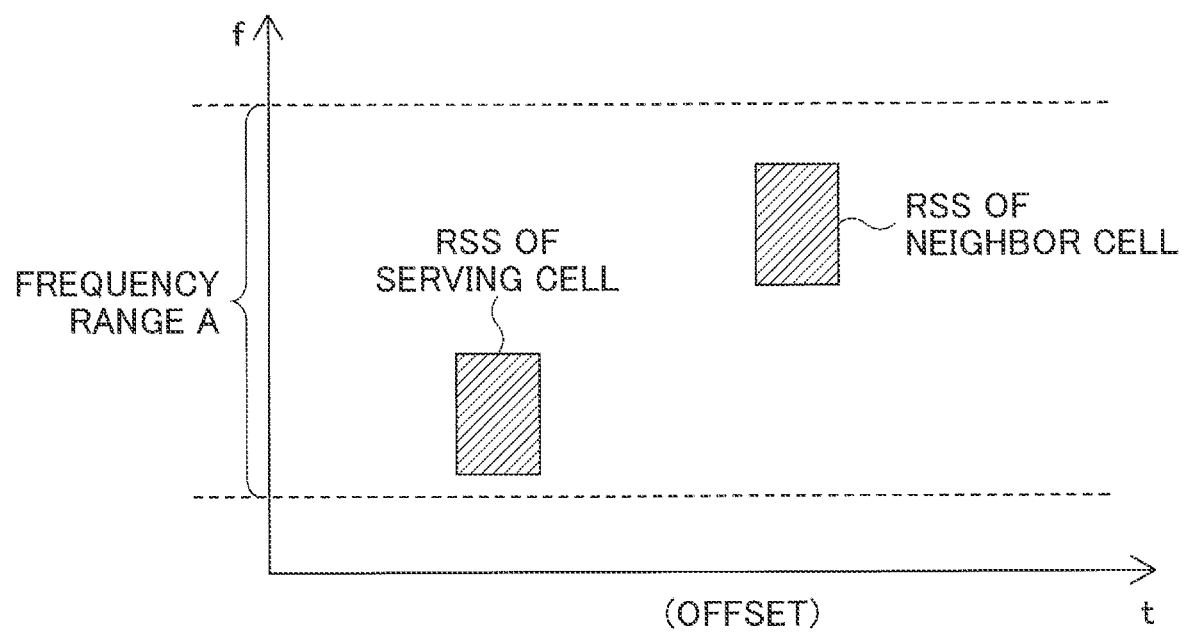
FIG. 9 is a diagram illustrating an example of RSS locations according to Example 1-1.

FIG. 9 illustrates an example of RSS time-frequency locations in a case where the base station apparatus 10 transmits, to the user terminal 20, information indicating that the frequency location of the RSS of the neighbor cell and the frequency location of the RSS of the serving cell are within a specific frequency range. The example of FIG. 9 indicates that the frequency location of the RSS of the neighbor cell and the frequency location of the RSS of the serving cell are within a frequency range A. The frequency range A may be a bandwidth that can be monitored by the user terminal 20.

The user terminal 20 knows the time-frequency location (that can be monitored by the user terminal 20) of the RSS of the serving cell by the RSS-Config. Therefore, for example, the user terminal 20 can perform blind detection, and receive and measure the RSS of the neighbor cell at a frequency location within the frequency range A where the frequency location of the RSS of the serving cell is present.

For example, the location of a time resource (time location) of the RSS of the neighbor cell is indicated from the base station apparatus 10 to the user terminal 20. The user terminal 20 may blindly detect the RSS of the neighbor cell, assuming that the time location of the RSS of the neighbor cell is close to or the same as the time location of the RSS of the serving cell.
cell.

Alternatively, without the above-described information, the user terminal 20 may change the operation depending on whether the serving cell and the neighbor cell are time-synchronized. An example of the operation performed by the user terminal 20 will be described with reference to a flowchart illustrated in FIG. 10. The neighbor cell is assumed to be detected by PSS/SSS of the neighbor cell, for example, In S101, the user terminal 20 determines whether or not the serving cell and the neighbor cell are time-synchronized. Time synchronization may be determined based on whether both the multiplexing mode of the serving cell and the multiplexing mode of the neighbor cell are TDD. When both the multiplexing mode of the serving cell and the multiplexing mode of the neighbor cell are TDD, it is determined that the serving cell and the neighbor cell are time-synchronized.

When the determination in S101 is yes (when it is determined that the serving cell and the neighbor cell are time-synchronized), the user terminal 20 receives the RSS of the neighbor cell and performs measurement in S102, assuming that the frequency location of the RSS of the neighbor cell and the frequency location of the RSS of the serving cell are within a specific frequency range. In S102, the user terminal 20 may perform the measurement, assuming that the frequency location of the RSS of the neighbor cell is the same as the frequency location of the RSS of the serving cell.

When the determination in S101 is no (when it is determined that the serving cell and the neighbor cell are not time-synchronized), the user terminal 20 uses information of the time-frequency location of the neighbor cell received from the base station apparatus 10 to measure the RSS of the neighbor cell in S103. For example, the user terminal 20 determines that the serving cell and the neighbor cell are not time-synchronized when the multiplexing mode of one of both of the serving cell and the neighbor cell is FDD.

Figure 10:
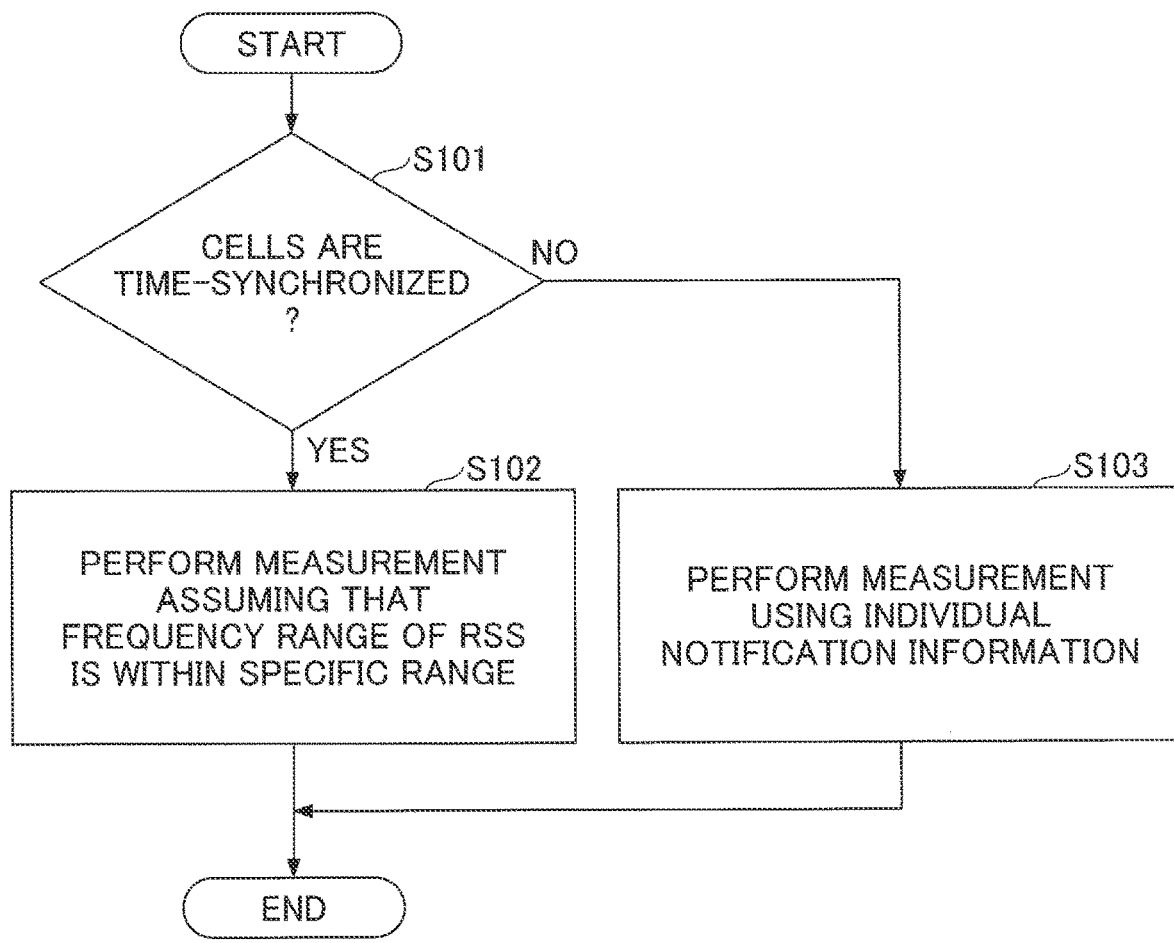
FIG. 10 is a diagram illustrating an example operation according to Example 1-1.

When the operation illustrated in FIG. 10 is performed, the base station apparatus 10 transmits detailed information of the time-frequency location of a neighbor cell that is not time-synchronized with the cell of the base station apparatus 10 via an RRC message or the like, and does not transmit detailed information of the time-frequency location of a neighbor cell that is time-synchronized with the own cell of the base station apparatus 10. However, the present embodiment is not limited to the above-described operation.

Example 1-2

In Example 1-2, the base station apparatus 10 indicates information on the time location of the RSS of the neighbor cell to the user terminal 20. Based on the information, the user terminal 20 determines whether the frequency location of the RSS of the neighbor cell is common to the frequency location of the RSS of the serving cell, or determines whether the frequency location of the RSS of the neighbor cell and the frequency location of the RSS of the serving cell are within a specific frequency range. That is, in Example 1-2, the user terminal 20 is indicated as to whether the frequency location of the RSS of the serving cell is common to the frequency location of the RSS of the neighbor cell, or indicated as to whether the frequency location of the RSS of the serving cell and the frequency location of the RSS of the neighbor cell are within a specific frequency range, implicitly.

For example, the information on the time location of the RSS of the neighbor cell may be information indicating whether the RSS of the serving cell and the RSS of the neighbor cell are present at the same time location. The "same time location" may mean that both the offset and periodicity are the same between the RSS of the serving cell and the RSS of the neighbor cell, or may mean that the offset is the same and the periodicity is different between the RSS of the serving cell and the RSS of the neighbor cell.

Figure 11:
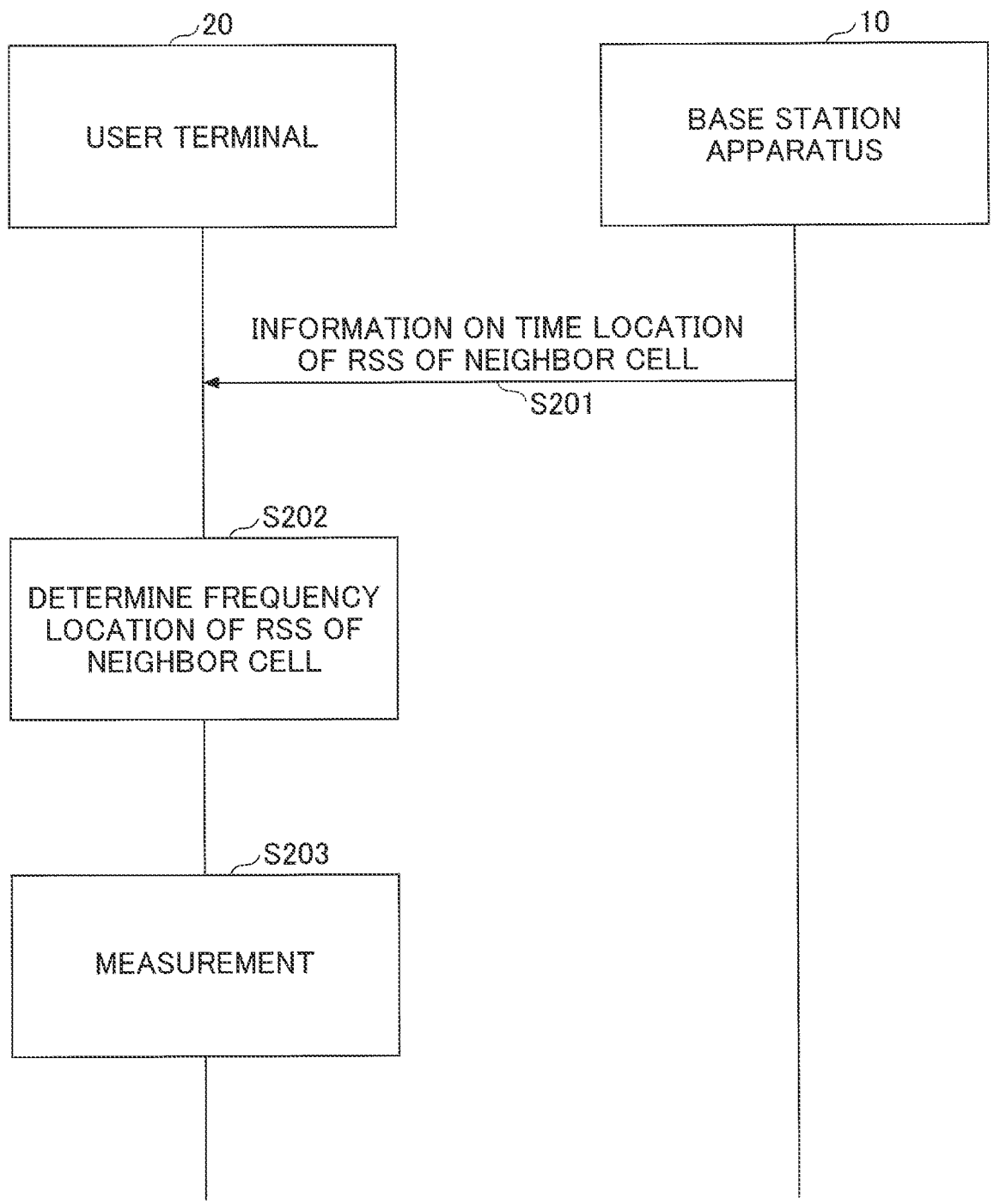
FIG. 11 is a diagram illustrating an example operation according to Example 1-2.

FIG. 11 illustrates an example operation according to Example 1-2. As illustrated in FIG. 11, in S201, the base station apparatus 10 transmits information on the time location of the RSS of the neighbor cell to the user terminal 20. In S201, the information may be transmitted at the same time when the configuration information of the RSS of the serving cell is transmitted in S1 of FIG. 4. Alternatively, the information may be transmitted at a different time from S1 of FIG. 4. In addition, the above-described information may be transmitted via any of an RRC message, MAC CE, and DCI. The information on the time location of the RSS of the neighbor cell may include identification information for identifying the neighbor cell (such as the cell ID of the neighbor cell).

In S202, the user terminal 20 determines the frequency location of the RSS of the neighbor cell based on the information received in S201.

Figure 12:
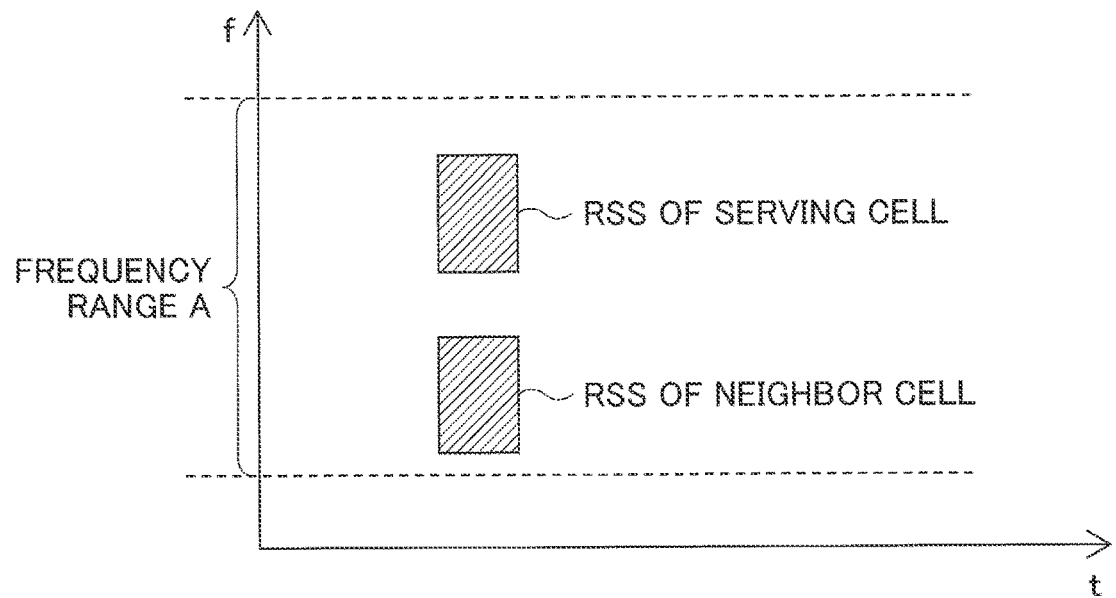
FIG. 12 is a diagram illustrating an example of RSS locations according to Example 1-2.

For example, if the information on the time location of the RSS of the neighbor cell indicates that the RSS of the serving cell and the RSS of the neighbor cell are present at the same time location, the user terminal 20 determines that the frequency location of the RSS of the neighbor cell and the frequency location of the RSS of the serving cell are within a specific frequency range, as illustrated in FIG. 12.

In S203, the user terminal 20 receives the RSS of the neighbor cell based on the determination made in S202, and performs measurement. For example, in S201, when the information on the time location of the RSS of the neighbor cell indicates that the RSS of the serving cell and the RSS of the neighbor cell are present at the same time location, the user terminal 20 receives the RSS of the neighbor cell and performs measurement at the time location of the RSS of the serving cell within a specific frequency range.

In the above example, when the information on the time location is received, the frequency location is assumed. However, for the time location, it may be determined that the time location of the RSS of the neighbor cell and the time location of the RSS of the serving cell are within a specified range.

Next, Example 1-3 will be described. Example 1-3 includes a first example and a second example.

First Example of Example 1-3

In the first example of Example 1-3, the base station apparatus 10 indicates (configures), to (for) the user terminal 20, the frequency location of the RSS of the serving cell and the frequency location of the RSS of the neighbor cell. The frequency location of the RSS of the neighbor cell is a relative location with respect to the frequency location of the RSS of the serving cell. Because the frequency location of the RSS of the neighbor cell can be specified as a relative location with respect to the frequency location of the RSS of the serving cell, it is assumed that the frequency location of the RSS of the neighbor cell is close to the frequency location of the RSS of the serving cell.

The above-described information may be transmitted along with the configuration information of the RSS of the serving cell in S1 of FIG. 4. Alternatively, the above-described information may be transmitted at a different time from S1 of FIG. 4. Further, instead of the existing RSS-Config information, the information described in Example 1-3 may be transmitted along with the configuration information of the RSS of the serving cell in S1 of FIG. 4.

Further, the above-described information may be transmitted via any of an RRC message, MAC CE, and DCI. The above-described information may include identification information for identifying the neighbor cell (such as the cell ID of the neighbor cell).

When the base station apparatus 10 transmits the frequency location (denoted as F1) of the RSS of the serving cell and a relative location (denoted as ΔF) with respect to the frequency location of the RSS of the serving cell, to the user terminal 20, F1 and ΔF may be separate information (e.g., separate indexes), or F1 and OF may be joint-coded.

For example, if F1 and ΔF are separate information, F1 may be indicated as 34 (e.g., the location indicated by an RB number), and OF may be indicated as 3 (meaning that ΔF is separated from F1 by 3RB). For example, if F1 and ΔF are joint-coded, for example, one index (e.g., binary number 11011) may be indicated. An index may, for example, be such that the high-order 3 bits (e.g., 110) represent F1 and the low-order 2 bits (e.g., 11) represent ΔF. In other words, the frequency location can be specified at different resolutions between the serving cell and the neighbor cell.

Figure 13:
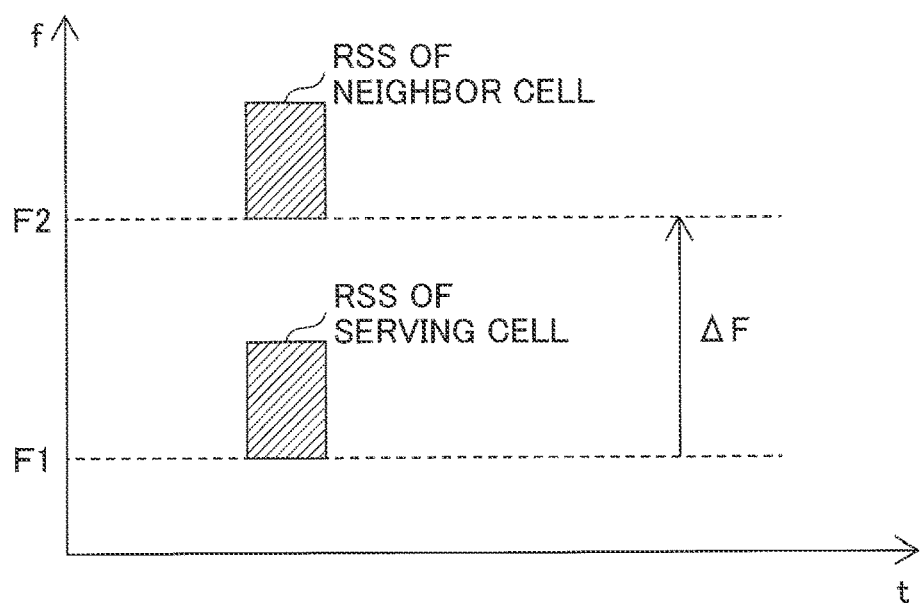
FIG. 13 is a diagram illustrating an example for indicating RSS locations according to Example 1-3.

When the user terminal 20 receives the frequency location (F1) of the RSS of the serving cell and the relative location (ΔF) with respect to the frequency location (F1), the user terminal 20 determines the frequency location of the RSS of the neighbor cell, as illustrated in FIG. 13. In the example of FIG. 13, the frequency location of the RSS of the neighbor cell can be expressed as F2=F1+ΔF.

In Example 1-3, the user terminal 20 may change the operation depending on whether the serving cell and the neighbor cell are time-synchronized, as in Example 1-1.

For example, when it is determined that the serving cell and the neighbor cell are time-synchronized, the user terminal 20 expects to receive F1 and ΔF from the base station apparatus 10. Then, the user terminal 20 receives F1 and OF, determines the frequency location of the RSS of the neighbor cell, and measures the RSS of the neighbor cell.

When it is determined that the serving cell and the neighbor cell are not time-synchronized, the user terminal 20 assumes that the user terminal 20 does not receive F1 and LF from the base station apparatus 10, and measures the RSS of the neighbor cell by utilizing detailed information of the time-frequency location of the neighbor cell received from the base station apparatus 10.

When both the multiplexing mode of the serving cell and the multiplexing mode of the neighbor cell are TDD, it may be determined that the serving cell and the neighbor cell are time-synchronized. Conversely, when both the multiplexing mode of the serving cell and the multiplexing mode of the neighbor cell are not TDD, it may be determined that the serving cell and the neighbor cell are not time-synchronized.

When it is determined that the serving cell and the neighbor cell are time-synchronized, the base station apparatus 10 may transmit F1 and ΔF to the user terminal 20. When it is determined that the serving cell and the neighbor cell are not time-synchronized, the base station apparatus 10 may transmit absolute information of the frequency location of the neighbor cell to the user terminal 20.

Further, when the neighbor cell and the serving cell are time-synchronized (both of the neighbor cell and the serving cell are TDD, for example), and the user terminal 20 determines that the time location of the RSS of the neighbor cell is the same as the time location of the RSS of the serving cell (for example, the information described in Example 1-2 is received), the user terminal 20 may receive F1 and ΔF from the base station apparatus 10, and may use F1 and ΔF to determine the frequency location of the RSS of the neighbor cell.

When the neighbor cell and the serving cell are not time-synchronized, or the time location of the RSS of the neighbor cell is not the same as the time location of the RSS of the serving cell, the user terminal 20 determines the frequency location of the RSS of the neighbor cell based on absolute information of the frequency location of the RSS of the neighbor cell received from the base station apparatus 10.

Further, when the neighbor cell and the serving cell are time-synchronized (both of the neighbor cell and the serving cell are TDD, for example), and the time location of the RSS of the neighbor cell is the same as the time location of the RSS of the serving cell, the base station apparatus 10 specifies a relative location as the frequency location of the RSS of the neighbor cell by transmitting F1 and ΔF. In addition, when the neighbor cell and the serving cell are not time-synchronized, or the time location of the RSS of the neighbor cell is not the same as the time location of the RSS of the serving cell, the base station apparatus 10 indicates absolute information of the frequency location of the RSS of the neighbor cell to the user terminal 20. However, the above-described operation performed by the base station apparatus 10 is merely an example.

The user terminal 20 may determine the frequency location (relative location) of the RSS of the neighbor cell based on the cell ID of the serving cell or based on the cell ID of the neighbor cell. For example, the remainder obtained by dividing the cell ID of the neighbor cell by N (N is a predetermined integer) may represent the relative location of the RSS of the neighbor cell with respect to the frequency location of the RSS of the serving cell. When the cell ID is used in this manner, it is not required to explicitly indicate the relative location as described above.

Further, the user terminal 20 may determine a frequency range, in which the frequency location (relative location) of the RSS of the neighbor cell is present, based on the cell ID of the serving cell or the cell ID of the neighbor cell. For example, the remainder obtained by dividing the cell ID of the neighbor cell by N (N is a predetermined integer) may represent a frequency range in which the relative location of the RSS of the neighbor cell, with respect to the frequency location of the RSS of the serving cell, is present.

The above-described cell ID may be a PCI, a local ID, or a group ID. Note that, throughout the specification, the cell ID may be a PCI, a local ID, or a group ID.

Second Example of Example 1-3

In the above example, the frequency location of the RSS has been described. However, the above-described example may apply to the time location of the RSS. Details will be described below. The first example and the second example of Example 1-3 may be combined. The time location described below may be an offset only or both an offset and periodicity. In the second example, it is assumed that the serving cell and the neighbor cell are time-synchronized.

In the second example of Example 1-3, the base station apparatus 10 indicates (configures), to (for) the user terminal 20, the time location of the RSS of the serving cell and the time location of the RSS of the neighbor cell. The time location of the RSS of the neighbor cell is a relative location with respect to the time location of the RSS of the serving cell. Because the time location of the RSS of the neighbor cell can be specified as a relative location with respect to the time location of the RSS of the serving cell, it is assumed that the time location of the RSS of the neighbor cell is close to the time location of the RSS of the serving cell. However, the second example is not limited to the above assumption.

The above-described information may be transmitted along with the configuration information of the RSS of the serving cell in S1 of FIG. 4. Alternatively, instead of the existing RSS-Config information, the above-described information may be transmitted at a different time from S1 of FIG. 4. Further, the information described in Example 1-3 may be transmitted along with the configuration information of the RSS of the serving cell in S1 of FIG. 4.

Further, the above-described information may be transmitted via any of an RRC message, MAC CE, and DCI. The above-described information may include identification information for identifying the neighbor cell (such as the cell ID of the neighbor cell).

When the base station apparatus 10 transmits the time location (denoted as T1) of the RSS of the serving cell and a relative location (denoted as ΔT) with respect to the time location of the RSS of the serving cell, to the user terminal 20, T1 and ΔT may be separate information (e.g., separate indexes), or T1 and ΔT may be joint-coded.

Figure 14:
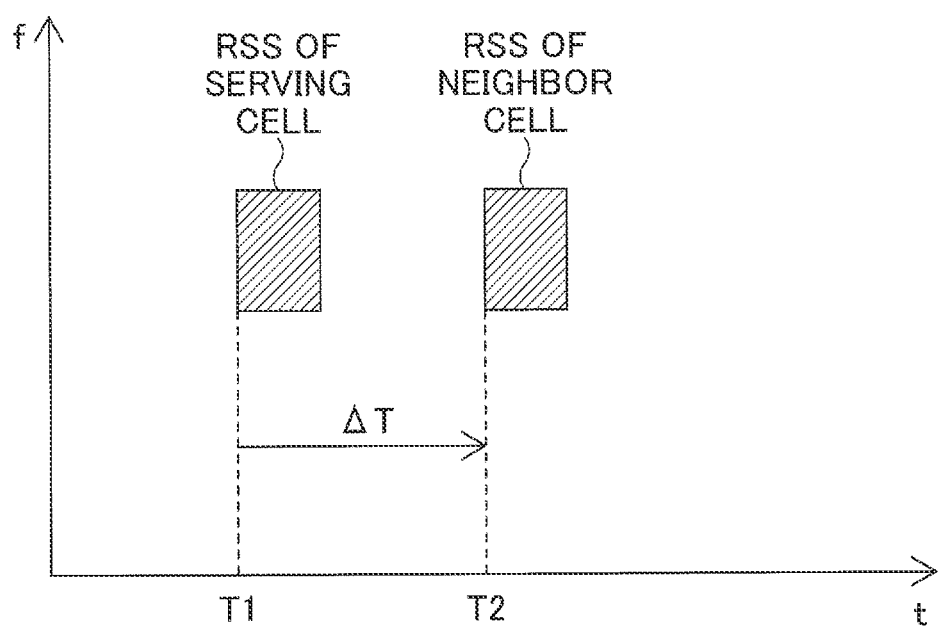
FIG. 14 is a diagram illustrating an example for indicating RSS locations according to Example 1-3.

When the user terminal 20 receives the time location (T1) of the RSS of the serving cell and the relative location (ΔT) with respect to the time location (T1), the user terminal 20 can determine the time location of the RSS of the neighbor cell, as illustrated in FIG. 14 (the horizontal axis indicates time). In the example of FIG. 14, the time location of the RSS of the neighbor cell can be expressed as T2=T1+ΔT.

The user terminal 20 may determine the time location (relative location) of the RSS of the neighbor cell based on the cell ID of the serving cell or based on the cell ID of the neighbor cell. For example, the remainder obtained by dividing the cell ID of the neighbor cell by N (N is a predetermined integer) may represent the relative location of the RSS of the neighbor cell with respect to the time location of the RSS of the serving cell. When the cell ID is used in this manner, it is not required to explicitly indicate the relative location as described above.

Further, the user terminal 20 may determine a time range (which may be referred to as a candidate range), in which the time location (relative location) of the RSS of the neighbor cell is present, based on the cell ID of the serving cell or the cell ID of the neighbor cell. For example, the remainder obtained by dividing the cell ID of the neighbor cell by N (N is a predetermined integer) may represent a time range in which the relative location of the RSS of the neighbor cell, with respect to the time location of the RSS of the serving cell, is present.

The above-described cell ID may be a PCI, a local ID, or a group ID. Note that, throughout the specification, the cell ID may be a PCI, a local ID, or a group ID.

According to Example 1 described above, the user terminal 20 can efficiently receive the resynchronization signal of the neighbor cell.

Example 2

Next, Example 2 will be described. In order for the user terminal 20 to measure an RSS for each neighbor cell, the base station apparatus 10 may transmit, to the user terminal 20, information (referred to as assist information or support information) indicating whether each of the neighbor cells is transmitting an RSS, and indicating at which time-frequency location each of the neighbor cells is transmitting the RSS. In this case, the user terminal 20 may use the assist information to perform RSS-based measurements for the neighbor cells. The information indicated from the base station apparatus 10 to the user terminal 20 described in Example 1 is an example of the assist information.

However, it is contemplated that the base station apparatus 10 does not create the list of the neighbor cells and information on the time-frequency location of the RSS of each of the neighbor cells.

Figure 15:
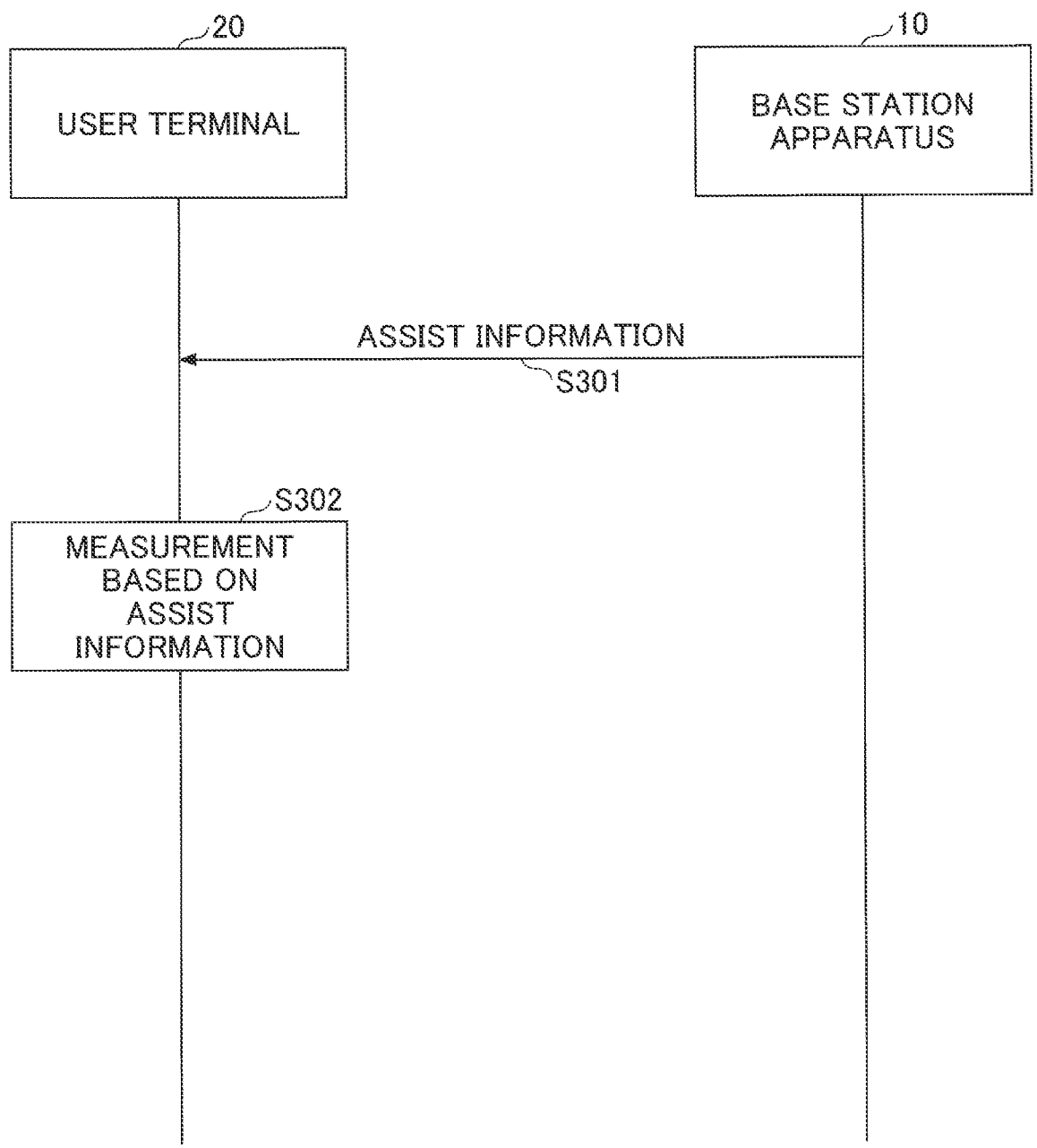
FIG. 15 is a diagram illustrating an example operation according Example 2.

FIG. 15 is a diagram illustrating an example operation when the assist information is used. In S301, the base station apparatus 10 transmits the assist information to the user terminal 20. The assist information transmitted in S301 is information that assists the user terminal 20 to perform RSS measurements for the neighbor cells, and includes the list of the neighbor cells (e.g., a list of cell IDs of the neighbor cells) and information on RSS measurements for the neighbor cells. The information on RSS measurements may be information on RSS time-frequency locations.

The user terminal 20, which has received the assist information, measures the RSS of each of the neighbor cells based on the assist information in S302. For example, for a given neighbor cell, the user terminal 20 monitors the time-frequency location of an RSS of the given neighbor cell indicated in the assist information, and receives the RSS of the given neighbor cell for measurement.

The assist information may be transmitted along with configuration information of the RSS of the serving cell in S1 of FIG. 4. Alternatively, the assist information may be transmitted at a different time from S1 of FIG. 4. Further, the assist information may be transmitted via any of an RRC message, MAC CE, and DCI.

As an example, the indication of the above-described assist information may be defined in the specification as an option in higher layer signaling, and the user terminal 20 may switch an operation related to the RSS measurement for the given neighbor cell between when the assist information has been received and when the assist information has not been received.

Figure 16:
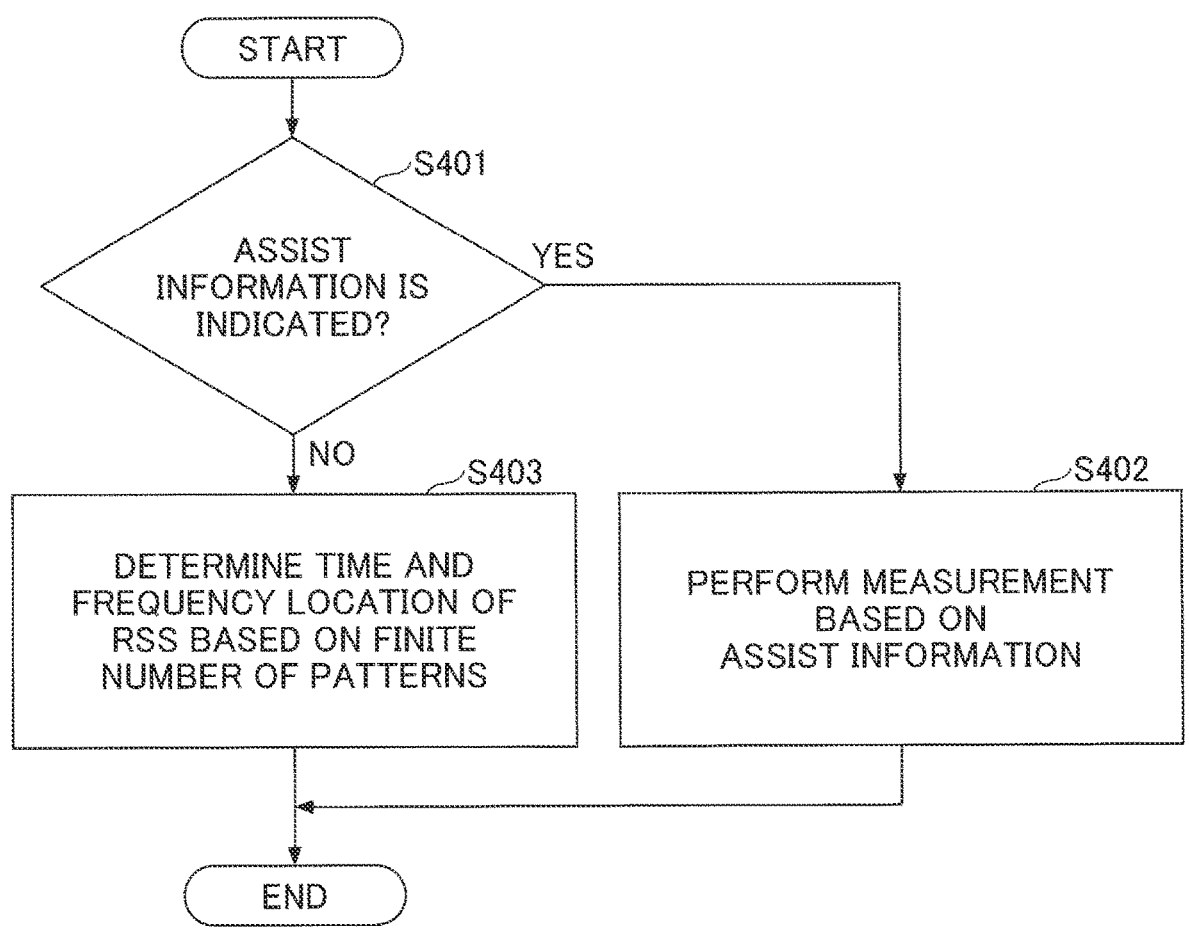
FIG. 16 is a diagram illustrating an example operation according Example 2.

FIG. 16 is a diagram illustrating an example of the above-described switching operation performed by the user terminal 20. In S401, the user terminal 20 determines whether the assist information has been received via the upper layer signaling (e.g., system information) in the serving cell in the service area.

When the user terminal 20 determines that the assist information has been received (yes in S401), the user terminal 20 measures the RSS of the neighbor cell based on the assist information in S402.

When the user terminal 20 determines that the assist information has not been received (no in S401), the user terminal 20 determines the time-frequency location of the RSS based on a finite number of patterns, and performs measurement in S403. The patterns may represent a plurality of candidate time-frequency locations of the RSS, and a range of the time-frequency locations of the RSS, for example. The user terminal 20 may blindly detect the RSS of the neighbor cell based on the patterns. Note that one pattern may be applied to a plurality of neighbor cells, or one pattern may be selected from a plurality of patterns in accordance with the cell ID of a neighbor cell.

The above-described patterns are defined in the specification as patterns used only for RSS measurements of neighbor cells, and may be preconfigured in the user terminal 20 and the base station apparatus 10. The above patterns may include any one, two, or three of the following patterns (1), (2), and (3).

(1) frequency locations of the RSS
(2) Transmission lengths and time offsets of the RSS, or subframes where the RSS can be located
(3) Frequency range in which the RSS of the serving cell and the RSS of the neighbor cell are present If the above-described pattern (3) is used, the RSS of the serving cell and the RSS of the neighbor cell are assumed to be within the specific frequency range. In this case, it can be determined that the user terminal 20 only monitors the frequency range around the known frequency location of the RSS of the serving cell.

If the above-described pattern 1 and pattern 2 are specified, the pattern 1 may include "(frequency location A1, transmission length A1, and time offset A1), (frequency location A2, transmission length A2, and time offset A2), and (frequency location A3, transmission length A3, and time offset A3)," and the pattern 2 may include "(frequency location B1, transmission length B1, and time offset B1), (frequency location B2, transmission length B2, and time offset B2), (frequency location B3, transmission length B, and time offset B3)."

Further, for example, when it is assumed that the user terminal 20 has detected the cell ID of the neighbor cell based on the PSS/SSS of the neighbor cell, the user terminal 20 determines that the pattern corresponding to the cell ID is the pattern 1.

In this case, the user terminal 20 detects the RSS of the neighbor cell using the pattern 1 and performs measurement. That is, the user terminal 20 monitors the RSS of the neighbor cell at each of (frequency location A1, transmission length A1, and time offset A1), (frequency location A2, transmission length A2, and time offset A2), and (frequency location A3, transmission length A3, and time offset A3). Then, the user terminal 20 receives the RSS at a time-frequency location where the RSS of the neighbor cell has been detected, and performs measurement.

Alternatively, in order to select one pattern from a plurality of patterns, the patterns may be associated with respective system bandwidths.

For example, the pattern 1 may be associated with a system bandwidth of 20 MHz and the pattern 2 may be associated with a system bandwidth of 10 MHz. In this case, when it is determined that the system bandwidth of a detected neighbor cell is 20 MHz based on system information of the detected neighbor cell, the user terminal 20 uses the pattern 1 to monitor an RSS of the detected neighbor cell.

In the above example, when the assist information is provided, the assist information is used. However, even when the assist information is not provided, a method similar to the described method without the assist information may be used.

For example, the user terminal 20 and the base station apparatus 10 may assume that the base station apparatus 10 can use a finite number of patterns for RSS locations. The base station apparatus 10 may indicate, to the user terminal 20, information (an example of assist information) indicating a time-frequency location where the RSS is actually transmitted, from among the finite number of patterns. The user terminal 20 identifies a pattern based on the cell ID or the like of the neighbor cell, and receives the RSS of the neighbor cell based on the information and the pattern. Accordingly, there is no need to determine a time-frequency location from all candidate locations, thus reducing the signaling capacity.

According to Example 2 described above, even when the user terminal 20 does not receive the support information that supports measurement of a resynchronization signal of a neighbor cell, the user terminal 20 can perform the measurement of the resynchronization signal of the neighbor cell.

Example 3

Next, Example 3 will be described. As described above, in order for the user terminal 20 to measure an RSS for each neighbor cell, the base station apparatus 10 may transmit, to the user terminal 20, information (assist information) indicating whether each of the neighbor cells is transmitting an RSS and also indicating a time and frequency location where each of the neighbor cells is transmitting the RSS if the RSS is transmitted.

When the assist information is transmitted, 7-bit time and frequency location of each of the neighbor cells may need to be indicated to the user terminal 20.

For this reason, it is necessary to reduce signaling overhead as described above, and thus, it is contemplated that RSS candidate locations (time locations, frequency locations, or time and frequency locations) for RSS measurements should be reduced.

As described above, it is contemplated that the "RSS time offset and RSS frequency location" is a function of the cell ID in order to reduce RSS candidate locations. However, if the RSS time offset and frequency location (=configurable in 99 different ways at maximum) are determined based on the cell ID, the RSS time-frequency locations may collide between the serving cell and a neighbor cell or between neighbor cells depending on the combination of cell IDs of the serving cell and the neighbor cell or the combination of cell IDs of the neighbor cells. In other words, depending on the combination of cell IDs, RSSs are unable to be allocated to orthogonal time and frequency resources. The details will be described below. Note that "orthogonal" means that time-frequency locations do not overlap As an example, assuming that RSSs are orthogonal to each other between cells in the frequency direction only, there are a maximum of 99 frequency locations (with a system bandwidth of 20 MHz). Thus, at the frequency locations based on cell IDs (504 cell IDs), there may be inter-cell collision. That is, a plurality of different cell IDs may be associated with the same frequency location, and frequency locations may collide between cells if RSSs are allocated based on the above relationship.

Assuming that RSSs are orthogonal to each other between cells in the time and frequency directions, time locations are configured in accordance with the transmission periods and transmission lengths of the RSSs, with respect to a maximum of 99 frequency locations. In some cases, RSS time and frequency locations can be uniquely configured by associating the time-frequency locations with the cell IDs (RSSs can be arranged so as to be orthogonal to each other between cells).

The following Example 1 indicates that RSSs can be arranged so as to be orthogonal to each other, and Example 2 indicates that RSSs are unable to be arranged so as to be orthogonal to each other.

Example 1: For RSS periodicity of 1280 ms, 32 time offsets can be applied at a time granularity of 40 ms. In this case, 32×99 (larger than 504) orthogonal locations can be assumed in the time direction. Therefore, orthogonal RSS time-frequency locations are possible for each cell ID.

Example 2: For RSS periodicity of 160 ms, 16 time offsets can be applied at a time granularity of 10 ms. For example, when the RSS transmission length is 40 ms, 4 location patterns can be assumed such that RSSs do not overlap, by applying time offsets in units of 40 ms. However, 4×99 is smaller than 504. Therefore, there may be a case where RSSs are not orthogonal to each other between cells when each cell ID represents the "time offset and frequency location".

In addition, if there is a limitation on a frequency range in which the user terminal 20 can monitor RSSs simultaneously, and the RSSs are located in the frequency range, it would be difficult to assume individual time and frequency resources for each cell ID.

In view of the above, in Example 3, candidate resources, that should be monitored by the user terminal 20 to detect neighbor cells, are defined by cell IDs, thus reducing signaling overhead. Example 3-1, Example 3-2, and Example 3-3 will be described below.

Example 3-1

In Example 3-1, the user terminal 20 determines one or more candidate time-frequency locations for RSS measurement for a neighbor cell, based on any one, two, or three of the following information (1), (2), and (3). From the viewpoint of the user terminal 20, the following information is neighbor cell information.

Figure 17:
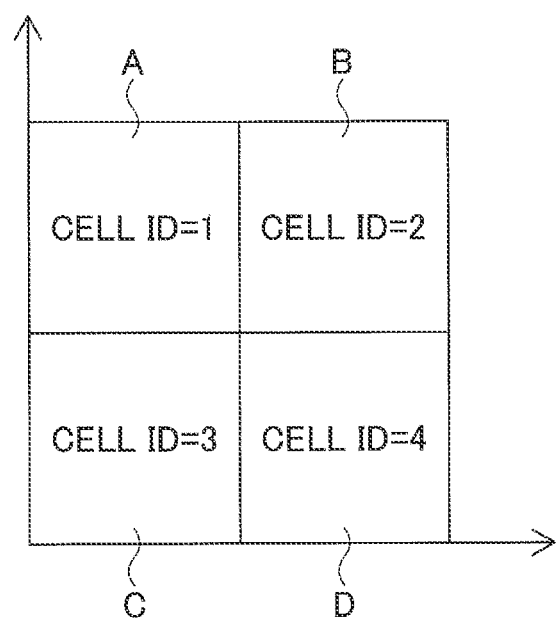
FIG. 17 is a diagram illustrating an example operation according Example 3-1.

(1) Physical cell ID (called cell ID) or part of information (e.g., local ID);
(2) LTE system bandwidth;
(3) RSS periodicity and time offset For example, as illustrated in FIG. 17, time and frequency domains represented by A are defined in the specification as candidate time-frequency locations where an RSS transmitted from a neighbor cell with a cell ID of 1 is located. Time and frequency domains represented by B are defined as candidate time-frequency locations where an RSS transmitted from a neighbor cell with a cell ID of 2 is located. The same applies to cell IDs 3 and 4. An RSS is transmitted at a given resource location in each domain.

The above description is from the viewpoint of the user terminal 20. A base station apparatus of neighbor cell transmits an RSS at a time-frequency location in a time-frequency domain corresponding to a cell ID of the base station apparatus.

In FIG. 17, the candidates are represented in the form of regions, but the candidates may be represented as a plurality of time-frequency locations where an RSS may be transmitted. The candidates represented as time and frequency domains or a plurality of time-frequency locations may be referred to as "time-frequency candidates".

The RSS time-frequency candidates (regions, a plurality of locations, etc.) of neighbor cells may overlap between the neighbor cells. For example, in the example illustrated in FIG. 17, the domain A may be associated with three cells with cell IDs of 1, 10, and 20. There would be no problem if RSSs actually transmitted do not overlap. The user terminal 20 can identify an RSS of an assumed cell based on the cell ID that can be acquired from the received RSS sequence.

With the above-described technique, signaling overhead can be reduced. The base station apparatus 10 of the serving cell (or the base station apparatus of the neighbor cell) may indicate, to the user terminal 20, a time-frequency location where an RSS is actually transmitted from a neighbor cell, from among time-frequency candidates (domains, a plurality of positions, or the like). As described above, because the locations (relative locations) from among the candidate locations are indicated, it is possible to indicate a small amount of information as compared to when the absolute locations are indicated.

The above-described indication allows the user terminal 20 to receive an RSS of a neighbor cell and perform measurement, without blind detection. An example of blind detection will be described in Example 3-2 below.

As described above, while candidates may be defined by default, optional notification may be defined in the specification such that the operator can manually adjust the RSS location, and the above-described candidates may be overwritten. That is, when an RSS at time and frequency locations other than the above-described candidates associated with the cell IDs is transmitted from a neighbor cell, the base station apparatus 10 of the serving cell may indicate, to the user terminal 20, that the RSS at the time and frequency locations other than the default candidates is transmitted from the neighbor cell.

In the following case 1, case 2, and case 3, the user terminal 20 may determine an RSS time-frequency candidate for a given neighbor cell based on the above-described information (1), (2), and (3).

Case 1: The user terminal 20 determines an RSS candidate time and frequency location (domains, a plurality of locations, etc.) associated with the cell ID of the neighbor cell. The user terminal 20 determines the candidate based on the definition in the specification as described above.

Case 2: Only when the LTE system bandwidth of the neighbor cell is maximum 20 MHz, the above case 1 may be applied. If the LTE system bandwidth of the neighbor cells is not maximum 20 MHz, the user terminal 20 may assume that the information described in Example 1 or the assist information described in Example 2 is indicated, and may perform measurement.

case 3: Only if the LTE system bandwidth of the neighbor cell is maximum 20 MHz, or only if the RSS periodicity is 1280 ms and the transmission length is 8 ms, the above case 1 may be applied. In neither case, for example, the user terminal 20 may assume that the information described in Example 1 or the assist information described in Example 2 is indicated, and may perform measurement. Note that, in the above expression "the RSS periodicity is 1280 ms and the transmission length is 8 ms", "8 ms" and "1280 ms" are merely examples.

Example 3-2

In Example 3-2, the user terminal 20 determines an RSS time and frequency candidate location (domains, a plurality of locations, etc.) as described in Example 3-1. In Example 3-2, from among the candidates, a time and frequency candidate location where an RSS is actually transmitted is not indicated to the user terminal 20, and the user terminal 20 blindly detects the RSS of the neighbor cell. The user terminal 20 can determine the RSS of the neighbor cell based on the cell ID that can be acquired from the RSS sequence.

If a candidate time and frequency location associated with the cell ID is specified by default, and only when an RSS is not located at the candidate location, the base station apparatus 10 may individually indicate information on the location of the RSS of the neighbor cell to the user terminal 20. The information on the location may be a specific time and frequency location, or may be the information described in Example 1.

Figure 18:
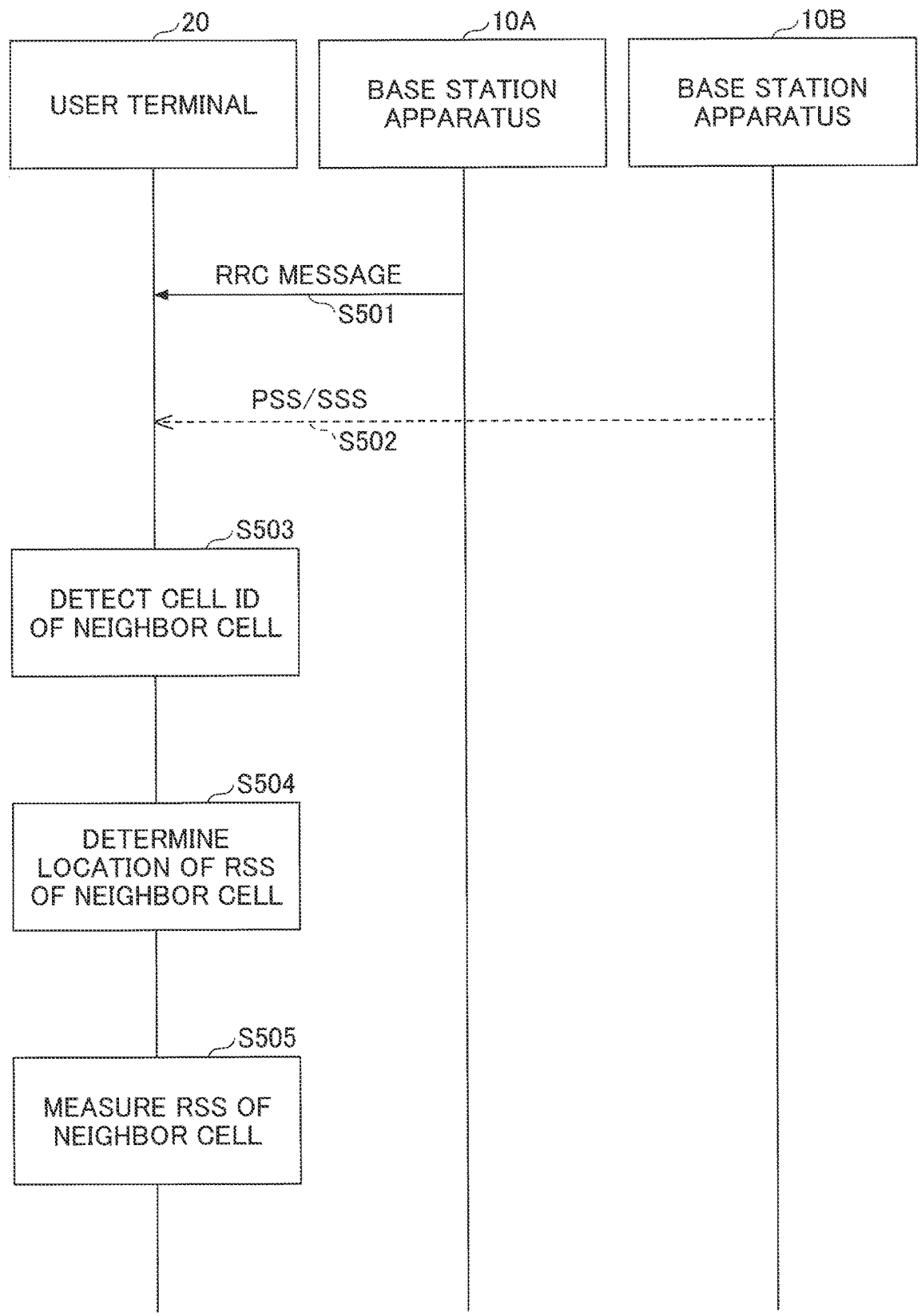
FIG. 18 is a diagram illustrating an example operation according Example 3-2.

An example operation according to Example 3-2 will be described with reference to FIG. 18. FIG. 18 illustrates a base station apparatus 10A that provides a serving cell for a user terminal 20, and a base station apparatus 10B that provides a neighbor cell.

In S501, an RRC message is transmitted from the base station apparatus 10A to the user terminal 20. The RRC Message includes information on the time-frequency location of an RSS of the serving cell. With the above information, the user terminal 20 can measure the RSS of the serving cell, in addition to an RSS of the neighbor cell as described below.

In S502, the user terminal 20 receives PSS/SSS from the base station apparatus 10B of the neighbor cell, and detects the cell ID of the neighbor cell in S503. The user terminal 20 identifies a time-frequency candidate of the RSS associated with the cell ID.

In S504, the user terminal 20 detects the RSS of the neighbor cell by monitoring the above-described candidate time-frequency location. In S505, the user terminal 20 measures the RSS of the neighbor cell.

Example 3-3

In any of Example 1, Example 2, Example 3-1, and Example 3-2, in the RSS measurement, the user terminal 20 may be able to simultaneously detect RSSs of a plurality of neighbor cells.

For this reason, in Example 3-3, the number of RSSs that can be simultaneously detected by the user terminal 20 (which may be referred to as the number of cell IDs detected by the RSSs) is predefined in the specification. The user terminal 20 detects RSSs up to the predefined number of RSSs. The number of RSSs that can be simultaneously detected by the user terminal 20 may be different between the RRC-IDLE state and the RRC-CONNECTED state.

Figure 19:
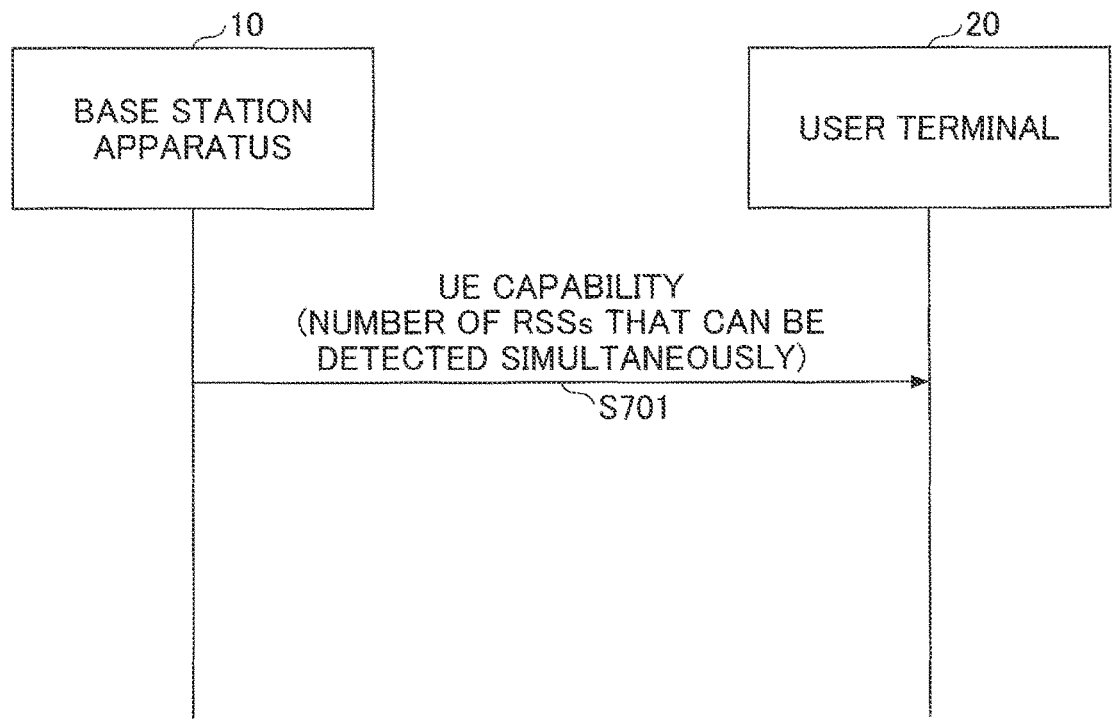
FIG. 19 is a diagram illustrating an example operation according Example 3-3.

Instead of (or in addition to) predefining the number of RSSs that can be simultaneously detected by the user terminal 20 in the specification, the user terminal 20 may indicates, as UE capability, the number of RSSs that can be simultaneously detected by the user terminal 20 to the base station apparatus 10 as illustrated in S701 of FIG. 19.

According to Example 3 described above, it is possible to reduce signaling overhead due to measurement of a resynchronization signal of a neighbor cell by the user terminal 20.

(Device Configuration)

Next, examples of functional configurations of the base station apparatus 10 and the user terminal 20 that perform the above-described processes and operations will be described. The base station apparatus 10 and the user terminal 20 include the functions described in the above embodiments. However, the base station apparatus 10 and the user terminal 20 may each include some of the functions described in the embodiments.

<Base Station Apparatus 10>

Figure 20:
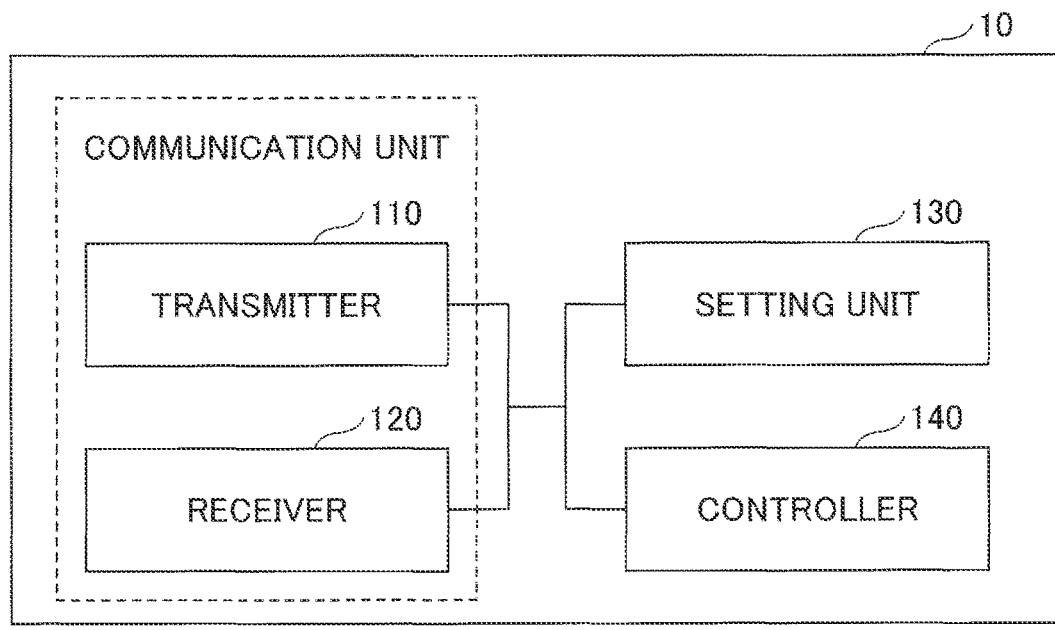
FIG. 20 is a diagram illustrating an example of a functional configuration of a base station apparatus 10 according to an embodiment of the present invention.

FIG. 20 is a diagram illustrating an example of a functional configuration of the base station apparatus 10. As illustrated in FIG. 5, the base station apparatus 10 includes a transmitter 110, a receiver 120, a setting unit 130, and a controller 140. The functional configuration illustrated in FIG. 20 is merely an example. As long as the operations according to the embodiments of the present invention can be performed, any functional classifications and names of functional units may be used.

The transmitter 110 includes a function to generate a signal and to wirelessly transmit the signal to the user terminal 20. The receiver 120 includes a function to receive various types of signals transmitted from the user terminal 20 and to obtain higher layer information from the received signals. In addition, the transmitter 110 includes a function to transmit NR-PSS, NR-SSS, NR-PBCH, DL/UL control signal, and the like, to the user terminal 20.

The setting unit 130 stores, in a storage device, preconfigured configuration information and various types of configuration information to be transmitted to the user terminal 20, and reads such setting information from the storage device as necessary.

The controller 140 performs scheduling for DL reception or UL transmission of the user terminal 20 via the transmitter 110. A functional unit of the controller 140 for signal transmission may be included in the transmitter 110, and a functional unit of the controller 140 for signal reception may be included in the receiver 120. Further, the transmitter 110 may be referred to as a transmitting device, the receiver 120 may be referred to as a receiving device.

<User Terminal 20>

Figure 21:
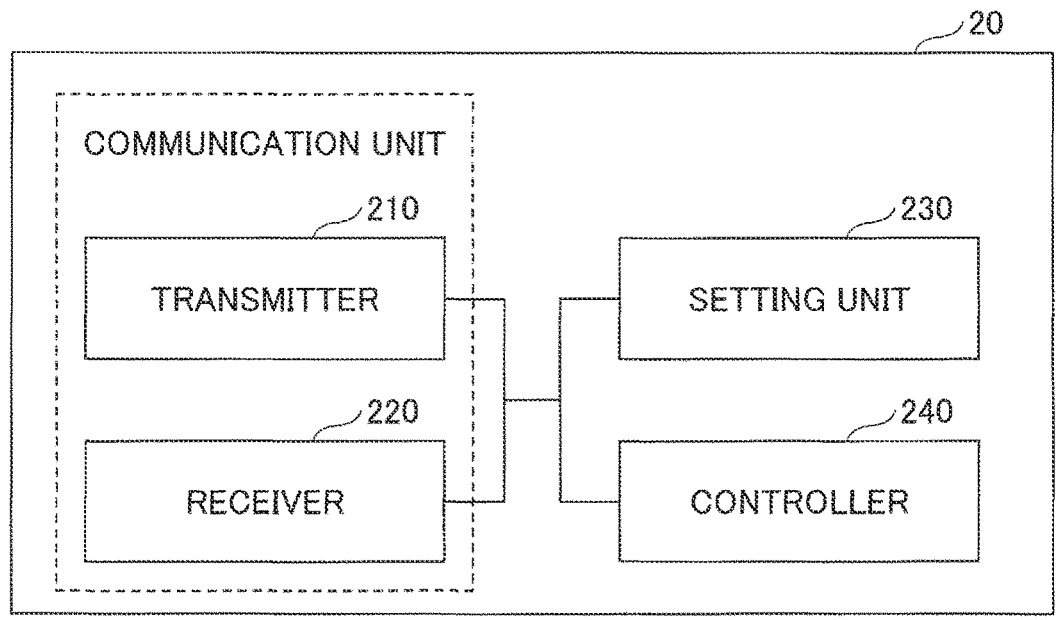
FIG. 21 is a diagram illustrating an example of a functional configuration of a user terminal 20 according to an embodiment of the present invention.

FIG. 21 is a diagram illustrating an example of a functional configuration of the user terminal 20. As illustrated in FIG. 21, the user terminal 20 includes a transmitter 210, a receiver 220, a setting unit 230, and a controller 240. The functional configuration illustrated in FIG. 21 is merely an example. As long as the operations according to the embodiments of the present invention can be performed, any functional classifications and names of functional units may be used.

The transmitter 210 generates a transmission signal from transmission data, and wirelessly transmits the transmission signal. The receiver 220 wirelessly receives various types of signals, and obtains higher layer signals from the received physical layer signals. In addition, the receiver 220 may include a function to receive an NR-PSS, an NR-SSS, an NR-PBCH, a DL/UL/SL control signal, DCI via PDCCH, data via PDSCH, and the like transmitted from the base station apparatus 10. Further, as D2D communication, the transmitter 210 may transmit a physical sidelink control channel (PSCCH), a physical sidelink shared channel (PSSCH), a physical sidelink discovery channel (PSDCH), a physical sidelink broadcast channel (PSBCH), and the like to another user terminal 20, and may receive a PSCCH, a PSSCH, a PSDCH, a PSBCH, and the like from the other user terminal 20.

The setting unit 230 stores, in a storage device, various types of configuration information received from the base station apparatus 10 or another user terminal 20 via the receiver 220, and reads such configuration information from the storage device as necessary. In addition, the setting unit 230 stores preconfigured setting information.

The controller 240 controls the user terminal 20. A functional unit of the controller 240 for signal transmission may be included in the transmitter 210, and a functional unit of the controller 240 for signal reception may be included in the receiver 220. Further, the transmitter 210 may be referred to as a transmitting device, the receiver 220 may be referred to as a receiving device.

(Summary)

According to the embodiments, a terminal as described in each of clauses 1 to 3 is provided.

<Clause 1>
(Clause 1-1)

A terminal includes a receiver 220 configured to receive, from a base station apparatus of a serving cell, information indicating a relationship between a frequency location of a resynchronization signal of the serving cell and a frequency location of a resynchronization signal of a neighbor cell, wherein the receiver receives the resynchronization signal of the neighbor cell at a frequency location based on the relationship.

(Clause 1-2)

A terminal includes a controller 240 configured to determine whether a serving cell and a neighbor cell are time-synchronized, and a receiver 220 configured to receive a resynchronization signal of the neighbor cell by assuming that a frequency location of a resynchronization signal of the serving cell and a frequency location of the resynchronization signal of the neighbor cell are in a specific relationship in a case where the controller 240 determines that the serving cell and the neighbor cell are time-synchronized.

(Clause 1-3)

A terminal includes a receiver 220 configured to receive information indicating a time location of a resynchronization signal of a neighbor cell from a base station apparatus of a serving cell, wherein the receiver receives the resynchronization signal of the neighbor cell by assuming that a frequency location or a time location of a resynchronization signal of the serving cell and a frequency location or a time location of the resynchronization signal of the neighbor cell are in a specific relationship based on the information.

(Clause 1-4)

A terminal includes a receiver 220 configured to receive, from a base station apparatus of a serving cell, a first location that is a location of a resynchronization signal of the serving cell, and a second location that is a relative location of a resynchronization signal of a neighbor cell with respect to the first location, wherein the receiver receives the resynchronization signal of the neighbor cell based on the first location and the second location.

(Clause 1-5)

The terminal according to clause 1-4, wherein the receiver receives the first location and the second location as a joint-coded value.

(Clause 1-6)

A base station apparatus comprising a transmitter 110 configured to transmit information indicating a relationship between a frequency location of a resynchronization signal of a serving cell and a frequency location of a resynchronization signal of a neighbor cell to a terminal, wherein the resynchronization signal of the neighbor cell is received by the terminal at a frequency location based on the relationship.

With the configuration described any of clauses 1-1 to 1-6, the user terminal can efficiently receive the resynchronization signal of the neighbor cell.

<Clause 2>
(Clause 2-1)

A terminal includes a controller 240 configured to, in a case where support information, supporting measurement using a resynchronization signal of a neighbor cell, is not received, determine a pattern for a resource position where the resynchronization signal of the neighbor cell is possibly transmitted based on information of the neighbor cell, and a receiver 220 configured to receive the resynchronization signal of the neighbor cell based on the pattern.

(Clause 2-2)

The terminal according to clause 2-1, wherein, in a case where the support information is received,
  the receiver uses the support information to receive the resynchronization signal of the neighbor cell, or
  the receiver uses the information of the neighbor cell to determine the pattern for the resource position where the resynchronization signal of the neighbor cell is possibly transmitted based on the information of the neighbor cell, and uses the pattern to receives the resynchronization signal of the neighbor cell.

(Clause 2-3)

The terminal according to clause 2-1 or clause 2-2, wherein the information of the neighbor cell is a cell ID or a system bandwidth.

(Clause 2-4)

The terminal according to any one of clauses 2-1 to clause 2-3, wherein the pattern includes a candidate frequency location, a candidate time location, or a frequency range of the resynchronization signal of the neighbor cell.

(Clause 2-5)

A reception method performed by a terminal. The reception method includes, in a case where support information, supporting measurement using a resynchronization signal of a neighbor cell is not received, a step of determining a pattern for a resource position where a resynchronization signal of a neighbor cell is possibly transmitted based on information of the neighbor cell, and a step of receiving the resynchronization signal of the neighbor cell based on the pattern.

With the configuration described any of clauses 2-1 to 2-5, the user terminal can perform the measurement using the resynchronization signal of the neighbor cell even if the support information, supporting the measurement using the resynchronization signal of the neighbor cell, is not received.

<Clause 3>

(Clause 3-1)

A terminal includes a controller 240 configured to determine a candidate resource location where a resynchronization signal of a neighbor cell is possibly transmitted based on information on the neighbor cell; and a receiver 220 configured to receive the resynchronization signal of the neighbor cell based on the candidate resource location.

(Clause 3-2)

The terminal according to clause 3-1, wherein the receiver receives the resynchronization signal of the neighbor cell based on the candidate resource location and information indicating a resource location where the resynchronization signal of the neighbor cell is actually transmitted.

(Clause 3-3)

The terminal according to clause 3-1, wherein the receiver blindly detects the resynchronization signal of the neighbor cell based on the candidate resource location.

(Clause 3-4)

The terminal according to any one of clause 3-1 to 3-3, wherein the information on the neighbor cell includes information on a cell ID, a system bandwidth, or a time location of the resynchronization signal.

(Clause 3-5)

The terminal according to any one of clause 3-1 to 3-4, further comprising a transmitter 210 configured to transmit, as capability information, the number of resynchronization signals that can be received simultaneously.

With the configuration described any of clauses 3-1 to 3-5, it is possible to reduce signaling overhead required when the user terminal performs measurement using the resynchronization signal of the neighbor cell.

(Hardware Configuration)

The block diagrams (FIG. 20 and FIG. 21) used in the above description of the embodiments illustrate functional unit blocks. These functional blocks (components) are implemented in any combination of hardware and/or software. Further, means for implementing the functional blocks are not particularly limited. In other words, the functional blocks may be implemented in one physically and/or logically coupled device or in multiple devices where two or more physically and/or logically separated devices are connected directly and/or indirectly (for example, in wired and/or wireless manners). A functional block may be implemented by combining software with the above-described one or more devices.

The functions include judging, deciding, determining, computing, calculating, processing, deriving, examining, searching, ascertaining, receiving, transmitting, outputting, accessing, solving, selecting, choosing, establishing, comparing, assuming, expecting, deeming, broadcasting, notifying, communicating, forwarding, configuring, reconfiguring, allocating, mapping, and assigning; however, the functions are not limited thereto. For example, a functional block (component) for transmission is referred to as a transmitting unit or a transmitter. For all the functions, the implementation methods are not particularly limited as described above.

Figure 22:
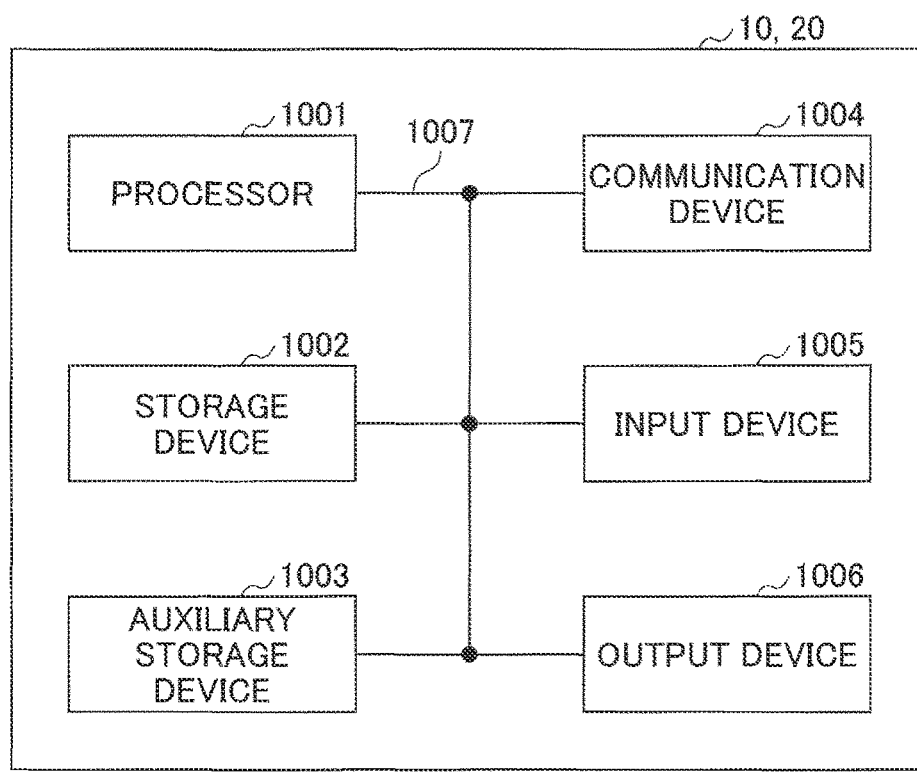
FIG. 22 is a diagram illustrating an example of a hardware structure of the base station apparatus 10 or the user terminal 20 according to an embodiment of the present invention.

For example, the base station apparatus 10 and the user terminal 20 according to an embodiment of the present disclosure may function as computers for executing a process of a radio communication method according to the present disclosure. FIG. 22 is a diagram illustrating a hardware configuration of each of the base station apparatus 10 and the user terminal 20 according to an embodiment of the present disclosure. Each of the above-described base station apparatus 10 and the user terminal 20 may be physically configured as a computer including a processor 1001, a storage device 1002, an auxiliary storage device 1003, a communication device 1004, an input device 1005, an output device 1006, and a bus 1007.

In the following description, the term "apparatus" can be interchangeably read as a circuit, a device, a unit or the like. The hardware configuration of each of the base station apparatus 10 and the user terminal 20 may be configured so as to include the one or more devices illustrated in FIG. 7 or so as not to include a part of the devices.

The functions of the base station apparatus 10 and the user terminal 20 are implemented by causing hardware such as the processor 1001 and the storage device 1002 to read predetermined software (a program) so as to allow the processor 1001 to execute operations, control communication by the communication device 1004, and control at least one of reading and writing of data from/into the storage device 1002 and the auxiliary storage device 1003.

The processor 1001 controls the whole computer by, for example, running an operating system. The processor 1001 may be configured by a central processing unit (CPU) including an interface with a peripheral device, a control device, an arithmetic device, and a register. For example, each of the above-described controller 140, the controller 240, and the like may be implemented by the processor 1001.

Further, the processor 1001 reads programs (program codes), software modules, and data from at least one of the auxiliary storage device 1003 and the communication device 1004 into the storage device 1002, and executes various processes in accordance therewith. Examples of the programs include a program for causing the computer to execute at least a part of operations described in the above embodiments. For example, the controller 140 of the base station apparatus 10 illustrated in FIG. 20 may be stored in the storage device 1002, and may be implemented by control programs executed by the processor 1001. In addition, for example, the controller 240 of the user terminal 20 illustrated in FIG. 21 may be stored in the storage device 1002, and may be implemented by control programs executed by the processor 1001. Although an example in which the above-described various types of processes are performed by the single processor 1001 has been described, the processes may be simultaneously or sequentially performed by two or more processors 1001. The processor 1001 may be implemented with one or more chips. Note that the programs may be transmitted from a network via an electric communication line.

The storage device 1002 is a computer-readable recording medium, and may include at least one of a read-only memory (ROM), an erasable programmable ROM (EPROM), an electrically erasable programmable ROM (EEPROM), and a random-access memory (RAM), for example. The storage device 1002 may be referred to as a register, a cache, or a main memory (a main storage device). The storage device 1002 can store, for example, programs (program codes) and software modules that can be executed to perform the communication method according to an embodiment of the present disclosure.

The auxiliary storage device 1003 is a computer-readable recording medium, and may include at least one of an optical disc such as a compact disc read-only memory (CD-ROM), a hard disk drive, a flexible disk, a magnetic optical disc (such as a compact disc, a digital versatile disc, and a Blu-ray (registered trademark) disk), a smart card, flash memory (such as a card, a stick, and a key drive), a floppy (registered trademark) disk, and a magnetic strip. The above-described recording medium may be a database or a server including at least one of the storage device 1002 and/or the auxiliary storage device 1003, or may be any other appropriate medium.

The communication device 1004 is hardware (a transmitting/receiving device) that performs communication between computers via a wired and/or wireless network, and may be referred to as a network device, a network controller, a network card, or a communication module. The communication device 1004 may include a radio frequency switch, a duplexer, a filter, a frequency synthesizer, and the like, in order to implement at least one of frequency division duplex (FDD) and time division duplex (TDD). For example, a transmitting/receiving antenna, an amplifier unit, a transmitting/receiving unit, a transmission line interface, and the like may be implemented by the communication device 1004. The transmitting/receiving unit may be may be physically or logically separated and implemented as a transmitting unit and a receiving unit.

The input device 1005 is an input device (such as a keyboard, a mouse, a microphone, a switch, a button, or a sensor) that receives inputs from the outside. The output device 1006 is an output device (such as a display, a speaker, or a LED ramp) that provides outputs to the outside. Note that the input device 1005 and the output device 1006 may be an integrated device (for example, a touch panel).

Further, the devices such as the processor 1001 and the storage device 1002 are connected with each other via the bus 1007 that communicates information. The bus 1007 may be a single bus or may be different buses for different devices.

Also, each of the base station apparatus 10 and the user terminal 20 may be configured to include hardware such as a macro processor, a digital signal processor (DSP), an application-specific integrated circuit (ASIC), a programmable logic device (PLD), and a field-programmable gate array (FPGA), and a part or all of the functional blocks may be implemented by the hardware. For example, the processor 1001 may include at least one of these hardware devices.

(Supplements to Embodiments)

Although the embodiments of the present invention have been described above, the disclosed invention is not limited to the above-described embodiments, and persons skilled in the art will appreciate various variations, modifications, alternatives, replacements, and the like. Specific examples of numerical values are used in the description in order to facilitate understanding of the present invention. However, these numerical values are merely examples, and any other appropriate values may be used, unless otherwise specified. Classifications of items in the above description are not essential to the present invention. Depending on necessity, subject matter described in two or more items may be combined and used, and subject matter described in another item may be applied to subject matter described in another item (as long as no contradiction occurs). A boundary of a functional unit or a processing unit in the functional block diagrams does not necessarily correspond to a boundary of a physical component. Operations of a plurality of functional units may be physically executed by a single component, or an operation of a single functional unit may be physically executed by a plurality of components. The orders of the procedures described in the embodiments may be changed as long as no contradiction occurs. For the convenience of description, the base station apparatus 10 and the user terminal 20 have been described by using the functional block diagrams; however, such devices may be implemented in hardware, software, or combinations thereof. Software executed by the processor included in the base station apparatus 10 in accordance with the embodiments of the present invention and software executed by the processor included in the user terminal 20 in accordance with the embodiments of the present invention may be stored in any appropriate storage medium, such as a random-access memory (RAM), a flash memory, a read-only memory (ROM), an EPROM, an EEPROM, a register, a hard disk drive (HDD), a removable disk, a CD-ROM, a database, and a server.

Notification of information is not limited to the aspects/embodiments described herein and may be performed in any other manner. For example, information may be indicated by physical layer signaling (for example, downlink control information (DCI) and uplink control information (UCI)), higher layer signaling (for example, radio resource control (RRC) signaling, medium access control (MAC) signaling, broadcast information (master information block (MIB), and system information block (SIB))), any other signal, or a combination thereof. Further, the RRC signaling may be referred to as an RRC message, and may be an RRC connection setup message or an RRC connection reconfiguration message.

The aspects/embodiments disclosed herein may be applied to at least one of systems that utilize Long-Term Evolution (LTE), LTE-Advanced (LTE-A), SUPER 3G, IMT-Advanced, 4G, 5G, Future Radio Access (FRA), NR (New Radio), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, UWB (ultra-wideband), Bluetooth (registered trademark), any other appropriate system, and a next-generation system enhanced based on the above systems.

The orders of procedures, sequences, and flowcharts of the aspects/embodiments described in this specification may be changed, as long as no contradiction occurs. For example, in a method described in this specification, various steps are presented in an exemplary order, and is not limited to a specific order presented.

Certain operations described as being performed by the base station apparatus 10 may be performed by its upper node, in some cases. In a network including one or more network nodes having the base station apparatus 10, it is apparent that various operations performed for communication with the user terminal 20 may be performed by at least one of the base station apparatus 10 and a network node other than the base station apparatus 10 (for example, a mobility management entity (MME) or a serving-gateway (S-GW) may be assumed, but the network node is not limited thereto). Although an example, in which there is one network node other than the base station apparatus 10, has been described, multiple other network nodes (for example, MMEs and S-GWs) may be used in combination.

Information, signals, or the like may be output from the upper layer (or the lower layer) to the lower layer (or the upper layer). Information, signals, or the like may be input/output via a plurality of network nodes.

Input/output information and the like may be stored in a specific location (for example, a memory) or managed by a management table. Input/output information and the like may be overwritten, updated, or added. Output information and the like may be deleted. Input information and the like may be transmitted to other devices.

According to the present disclosure, the determination may be made by a value (0 or 1) represented by one bit, may be made by a Boolean value (Boolean: true or false), and may be made by comparison of numerical values (comparison with a predetermined value, for example).

Software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like, regardless of whether the software is referred to as software, firmware, middleware, microcode, hardware description language, or any other name.

Furthermore, software, instructions, information, and the like may be transmitted and received via a transmission medium. For example, when the software is transmitted from a website, server, or any other remote source, using at least one of a wired technology (such as a coaxial cable, a fiber optic cable, a twisted pair, and a digital subscriber line (DSL)) and a wireless technology (such as infrared and microwaves), these wired and/or wireless technologies are included within the definition of the transmission medium.

Information, signals, and the like as described herein may be represented with use of any of various different techniques. For example, data, an instruction, a command, information, a signal, a bit, a symbol, and a chip that may be referred to throughout the above description may be represented by a voltage, a current, an electromagnetic wave, a magnetic field, a magnetic particle, an optical field, a photon, or any combination thereof.

Terms described herein and terms necessary to understand the present disclosure may be replaced with terms having the same or similar meanings. For example, at least one of a channel and a symbol may be a signal. In addition, the signal may be a message. Further, a component carrier (CC) may be referred to as a carrier frequency, a cell, or a frequency carrier.

As used herein, the terms "system" and "network" are interchangeably used.

Further, information, parameters, and the like described herein may be represented as absolute values, may be represented as relative values from predetermined values, or may be represented as other corresponding information. For example, a radio resource may be specified by an index.

Names used for the above-described parameters are not intended to be restrictive in any way. Further, there may be a case where formulas using these parameters may be different from those explicitly disclosed herein. Various channels (such as a PUCCH and a PDCCH) and information elements can be identified with any names, and names assigned to these various channels and information elements are not intended to be restrictive in any way.

In the present disclosure, the terms such as "base station (BS)", "radio base station", "base station apparatus", "fixed Station", "Node B", "eNode B (eNB)", "gNode B (gNB)", "access point", "transmission/reception point", "cell", "sector", "cell group", "carrier", and "component carrier" may be used interchangeably. The base station may be referred to as a macro cell, a small cell, a femtocell, a picocell, or any other term.

A base station can accommodate one or more (three, for example) cells. If the base station accommodates multiple cells, the whole coverage area of the base station can be segmented into multiple smaller areas, and the smaller areas can each provide a communication service by using a base station subsystem (such as a remote radio head (RRH), which is an indoor small base station). The term "cell" or "sector" refers to a part of or the entirety of the coverage area of at least one of a base station and a base station subsystem providing a communication service in this coverage.

In the present disclosure, the terms such as "mobile station (MS)", "user terminal", "user equipment (UE)", and "terminal" may be used interchangeably.

A mobile station may be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate term.

At least one of the base station and the mobile station may be referred to as a transmitting device, a receiving device, a communication device, or the like. At least one of the base station and the mobile station may be a device mounted on a mobile body, the moving body itself, or the like. The moving body may be a vehicle (such as a car or an airplane, for example), a moving body that moves unmanned (such as a drone or an autonomous vehicle, for example), or a robot (manned or unmanned). At least one of the base station and the mobile station also includes a device that does not necessarily move during communication operations. For example, at least one of the base station and the mobile station may be an Internet of Things (IoT) device such as a sensor.

The base station in the present disclosure may be replaced with the user terminal. For example, each aspect/embodiment of the present disclosure may be applied to a configuration such that the communication between the base station and the user terminal is replaced with communication between a plurality of user terminals 20 (which may be referred to as device-to-device (D2D) communication, vehicle-to-everything (V2X) communication, or the like). In this case, the functions of the above-described base station apparatus 10 may be included in the user terminal 20. Additionally, the terms such as "uplink" and "downlink" may be replaced with terms corresponding to inter-terminal communication (e.g., "side"). For example, an uplink channel, a downlink channel may be replaced with a side channel.

Similarly, the user terminal in the present disclosure may be replaced with the base station. In this case, the functions included in the above-described user terminal may be included in the base station.

As used herein, the terms "determining" and "deciding" may include various types of operations. For example, "determining" and "deciding" may include determining that calculating, computing, processing, deriving, investigating, looking up (for example, looking up a table, a database, or any other data structure), or ascertaining is considered to be performed. Also, the term "determining" may include deeming that a result of judging, calculating, computing, processing, deriving, investigating, looking up (e.g., search in a table, a database, or another data structure), or ascertaining is determined or decided. Furthermore, "determining" and "deciding" may include deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided. Further, "determining (deciding)" may be replace with "assuming", "expecting", or "considering".

The terms "connected", "coupled", or any variation thereof mean any direct or indirect connection or coupling between two or more elements, and may include the presence of one or more intermediate elements between the two elements "connected" or "coupled" to each other. The coupling or connection between the elements may be physical, logical or a combination thereof. For example, "connected" may be replaced with "access". As used herein, two elements can be considered to be mutually "connected" or "coupled" by using at least one of one or more wires, cables and printed electrical connections, and, as some non-limiting and non-inclusive examples, by using electromagnetic energy such as electromagnetic energy with a wavelength in a radio frequency range, a microwave range, and an optical range (both visible and invisible).

The reference signal may be abbreviated as RS, and may be referred to as a pilot according to applicable standards.

As used herein, the term "based on" does not mean "based only on", unless otherwise specified. In other words, the term "based on" means both "based only on" and "based at least on".

Any reference to elements that use terms such as "first" and "second" used herein does not generally limit the amount or order of these elements. These terms can be used in the present disclosure as a convenient way to distinguish between two or more elements. Accordingly, the reference to the first and second elements does not mean that only two elements can be employed, or does not mean that the first element must precede the second element in any fashion.

The term "means" used in a configuration of each apparatus as described above may be replaced with "unit", "circuit", "device", or the like.

As long as the terms "include", "including", and any variation thereof are used in the present disclosure, these terms are intended to be inclusive similar to the term "comprising". Further, the term "or" used in the present disclosure is intended not to be "exclusive or".

A radio frame may be configured by one or more frames in a time domain. In the time domain, the one or more frames may be referred to as subframes. The subframes may be each configured by one or more slots in the time domain. Further, a subframe may be a fixed time length (e.g., 1 ms) that does not depend on numerology.

The numerology may be a communication parameter to be applied to at least one of transmission or reception of a signal or a channel. The numerology may represent, for example, at least one of a subcarrier spacing (SCS), a bandwidth, a symbol length, a cyclic prefix length, a transmission time interval (TTI), a symbol number per TTI, a radio frame configuration, a specific filtering process performed by a transmitter/receiver in the frequency domain, and a specific windowing process performed by a transmitter/receiver in a time domain.

A slot may be configured by one or more symbols (such as orthogonal frequency division multiplexing (OFDM) symbols or single carrier frequency division multiple access (SC-FDMA) symbols) in a time domain. A slot may be a unit of time based on the numerology.

A slot may include a plurality of mini-slots. In a time domain, each mini-slot may be configured by one or more symbols. A mini-slot may be referred to as a sub-slot. A mini-slot may be configured by fewer symbols than those of a slot. A PDSCH (or PUSCH) transmitted in a unit of time that is greater than a mini-slot may be referred to as "PDSCH (or PUSCH) mapping type A". A PDSCH (or PUSCH) transmitted using a mini-slot may be referred to as "PDSCH (or PUSCH) mapping type B".

A radio frame, a subframe, a slot, a mini-slot, and a symbol each represent a time unit for transmitting a signal. The radio frame, the subframe, the slot, the mini-slot, and the symbol may be denoted by respective different names.

For example, one subframe may be referred to as a transmission time interval (TTI), a plurality of consecutive subframes may be referred to as a TTI, or one slot or one mini-slot may be referred to as a TTI. Namely, at least one of a subframe and a TTI may be a subframe (1 ms) in the existing LTE, may be a time interval shorter than 1 ms (e.g., 1 to 13 symbols), or a time interval longer than 1 ms. Note that the unit representing a TTI may be referred to as a slot, a mini-slot, or the like, instead of a subframe. Further, one slot may be referred to as a unit time. A unit time may differ for each cell in accordance with the numerology.

For example, a TTI refers to the minimum time unit for scheduling in radio communication. For example, in the LTE system, the base station performs scheduling for allocating radio resources (such as a frequency bandwidth and transmission power that can be used in each user terminal 20) in units of TTIs to each of the user terminal 20. Note that the definition of "TTI" is not limited the above.

A TTI may be a transmission time unit, such as a channel-coded data packet (transport block), a code block, or a codeword, or may be a processing unit for scheduling or link adaptation. Note that, when a TTI is provided, a time interval (e.g., a symbol number) onto which a transport block, a code block, or a code ward is actually mapped may be shorter than the TTI.

Note that, when one slot or one mini-slot is referred to as a TTI, one or more TTIs (i.e., one or more slots or one or more mini-slots) may be the minimum time unit for scheduling. Additionally, the number of slots (the number of mini-slots) forming the minimum time unit for scheduling may be controlled.

A TTI with a time length of 1 ms may be referred to as an ordinary TTI (a TTI in LTE Rel. 8-12), a normal TTI, a long TTI, an ordinary subframe, a normal subframe, a long subframe, a slot, or the like. A TTI that is shorter than a normal TTI may be referred to as a shortened TTI, a short TTI, a partial TTI (or a fractional TTI), a shortened subframe, a short subframe, a mini-slot, a sub-slot, a slot, or the like.

Note that a long TTI (e.g., a normal TTI, a subframe, or the like) may be replaced with a TTI with a time length exceeding 1 ms, and a short TTI (e.g., a shortened TTI or the like) may be replaced with a TTI with a TTI length that is shorter than the TTI length of the long TTI and longer than or equal to 1 ms.

A resource block (RB) is a resource allocation unit in the time domain and the frequency domain, and may include one or more consecutive subcarriers in the frequency domain. A number of subcarriers included in an RB may be the same, irrespective of numerology, and may be 12, for example. The number of subcarriers included in an RB may be determined based on numerology.

Further, an RB may include one or more symbols in the time domain, and may have a length of one slot, one mini-slot, one subframe, or one TTI. Each of one TTI and one subframe may be configured by one or more resource blocks.

Note that one or more RBs may be referred to as physical resource blocks (PRBs), subcarrier groups (SCGs), resource element groups (REGs), PRB pairs, RB pairs, or the like.

Further, a resource block may be configured by one or more resource elements (REs). For example, one RE may be a radio resource area of one subcarrier and one symbol.

A bandwidth part (BWP) (which may also be referred to as a partial bandwidth, for example) may represent, in a certain carrier, a subset of consecutive common resource blocks (common RBs) for a certain numerology. As used herein, the common RB may be specified by an index of an RB when a common reference point of the carrier is used as reference. A PRB may be defined in a BWP, and may be numbered in the BWP.

A BWP may include a BWP for UL (UL BWP) and a BWP for DL (DL BWP). For the UE, one or more BWPs may be configured in one carrier.

At least one of configured BWPs may be active, and the UE is not required to assume that a predetermined signal/channel is transmitted/received outside the active BWP(s). Note that "cell", "carrier", and the like in the present disclosure may be replaced with "BWP".

The structures of the above-described radio frame, subframe, slot, mini-slot, symbol, and the like are merely examples. For example, the following configurations can be variously changed: the number of subframes included in a radio frame; the number of slots per subframe or per radio frame; the number of mini-slots included in a slot; the number of symbols and RBs included in a slot or mini-slot; the number of subcarriers included in an RB; and the number of symbols, the symbol length, the cyclic prefix (CP) length, and the like within a TTI.

In the present disclosure, for example, if articles such as "a", "an", and "the" in English are added to the translation, nouns following the articles may be plural.

In the present disclosure, the term "A and B are different" may imply that "A and B are different from each other". Note that the term may also imply "each of A and B is different from C." The terms such as "separated" and "coupled" may also be interpreted similarly.

The aspects/embodiments described herein may be used alone, may be used in combination, or may be switched at the time of execution. Furthermore, notification of predetermined information (e.g., notification of "being X") is not limited to notification that is made explicitly, and the notification may be made implicitly (by not sending notification of the predetermined information, for example).

In the present disclosure, the transmitter 210 and the receiver 220 are examples of communication units. The transmitter 110 and the receiver 120 are examples of communication units. A UE capability enquiry is an example of a first RRC message that inquires the capabilities of the user terminal. UE capability information is an example of a second RRC message that reports UE capabilities.

Although the embodiments of the present invention have been described in detail, it will be readily apparent to those skilled in the art that the present invention is not limited to the embodiments described in the specification. Variations and modifications can be made to the present invention without departing from the scope of the present invention described in the claims. Accordingly, the description of the present specification is intended to provide an illustrative description and is not intended to have any restrictive meaning to the present invention.

REFERENCE SYMBOLS LIST 10 base station apparatus
110 transmitter
120 receiver
130 setting unit
140 controller
20 user terminal
210 transmitter
220 receiver
230 setting unit
240 controller
1001 processor
1002 storage device
1003 auxiliary storage device
1004 communication device
1005 input device
1006 output device

The invention claimed is:

1. A terminal comprising:
a controller that determines, based on information on a plurality of neighbor cells, a location of a resource of a resynchronization signal that does not overlap between equal to or less than a predetermined number of neighbor cells with respect to time or frequency; and
a receiver that receives a resynchronization signal of a neighbor cell based on the location,
wherein the information on the plurality of neighbor cells includes information on whether measurement using a resynchronization signal is possible in each cell.

2. The terminal as claimed in claim 1, wherein the information on the plurality of neighbor cells includes a cell ID.

3. A communication system comprising:
a terminal comprising:
a controller that determines, based on information on a plurality of neighbor cells, a location of a resource of a resynchronization signal that does not overlap between equal to or less than a predetermined number of neighbor cells with respect to time or frequency; and
a receiver that receives a resynchronization signal of a neighbor cell based on the location,
wherein the information on the plurality of neighbor cells includes information on whether measurement using a resynchronization signal is possible in each cell, and
a base station that transmits a resynchronization signal to the terminal.

4. A communication method executed by a terminal, the communication method comprising:
determining, based on information on a plurality of neighbor cells, a location of a resource of a resynchronization signal that does not overlap between equal to or less than a predetermined number of neighbor cells with respect to time or frequency; and
receiving a resynchronization signal of a neighbor cell based on the location, wherein the information on the plurality of neighbor cells includes information on whether measurement using a resynchronization signal is possible in each cell.

\* \* \* \* \*